US012803718B2

(12) United States Patent
Huang et al.

(10) Patent No.: US 12,803,718 B2
(45) Date of Patent: Nov. 17, 2026

(54) SEMI-PERSISTENT SCHEDULED FEEDBACK DEFERRAL WITH CARRIER SWITCHING IN UPLINK CARRIER AGGREGATION

(71) Applicant: QUALCOMM Incorporated, San Diego, CA (US)

(72) Inventors: Yi Huang, San Diego, CA (US); Konstantinos Dimou, New York, NY (US); Yan Zhou, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 18/562,091

(22) PCT Filed: Jun. 23, 2022

(86) PCT No.: PCT/US2022/034791
§ 371 (c)(1),
(2) Date: Nov. 17, 2023

(87) PCT Pub. No.: WO2023/283057
PCT Pub. Date: Jan. 12, 2023

(65) Prior Publication Data

US 2025/0088316 A1 Mar. 13, 2025

(30) Foreign Application Priority Data

Jul. 8, 2021 (GR) .............................. 20210100460

(51) Int. Cl.
*H04L 1/1829* (2023.01)
*H04W 72/0446* (2023.01)
*H04W 72/11* (2023.01)

(52) U.S. Cl.
CPC ....... *H04L 1/1854* (2013.01); *H04W 72/0446* (2013.01); *H04W 72/11* (2023.01)

(58) Field of Classification Search
CPC .... H04L 1/1854; H04L 1/1887; H04W 72/11; H04W 72/0446
See application file for complete search history.

(56) References Cited

U.S. PATENT DOCUMENTS

2024/0080774 A1* 3/2024 Wang .................. H04W 52/146
2024/0121062 A1* 4/2024 Salah .................... H04L 1/1854

(Continued)

OTHER PUBLICATIONS

International Search Report and Written Opinion—PCT/US2022/034791—ISA/EPO—Sep. 15, 2022.

(Continued)

*Primary Examiner* — Charles C Jiang
*Assistant Examiner* — Ryan C Kavleski
(74) *Attorney, Agent, or Firm* — Holland & Hart LLP

(57) ABSTRACT

Methods, systems, and devices for wireless communications are described. A user equipment (UE) may monitor a first slot for a semi persistent scheduled (SPS) transmission on a first serving cell of multiple serving cells in a physical uplink control channel (PUCCH) group. The UE may be configured to transmit feedback information for the SPS transmission in a target slot. The UE may select either the target slot or a subsequent second slot for transmission of the feedback information based on an availability of uplink resources on the multiple serving cells in the target slot. The UE may transmit the feedback information to a base station in the target slot or the subsequent second slot based on the selection. The described techniques may enable the UE to transmit the feedback information with reduced latency, among other benefits.

26 Claims, 18 Drawing Sheets

(56) References Cited

U.S. PATENT DOCUMENTS

| | | | | |
|---|---|---|---|---|
| 2024/0163877 | A1* | 5/2024 | Xu | H04L 1/1812 |
| 2024/0298318 | A1* | 9/2024 | Andersson | H04W 72/1273 |
| 2024/0381366 | A1* | 11/2024 | Chien | H04W 72/11 |

OTHER PUBLICATIONS

NEC: "Ue Feedback Enhancements for HARQ-ACK", R1-2105258, 3GPP TSG RAN WG1 #105-e, 3rd Generation Partnership Project (3GPP), Mobile Competence Centre, 650, Route Des Lucioles, F-06921 Sophia-Antipolis Cedex, vol. Ran WG1, No. e-Meeting, May 10, 2021-May 27, 2021, May 12, 2021, XP052011319, pp. 1-6, pp. 3-5.

Qualcomm Incorporated: "HARQ-ACK Enhancement for IOT and URLLC", 3GPP TSG RAN WG1 #104bis, R1-2103163, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177963, 23 Pages, Section 7, Section 5—Retransmission of dropped HARQ-ACK, pp. 1, 12,3,18 figure 9.

SAMSUNG: "On HARQ-ACK Reporting Enhancements", 3GPP Tsg Ran WG1 #104b-e, R1-2103236, 3rd Generation Partnership Project (3GPP), Mobile Competence Centre, 650, Route Des Lucioles, F-06921 Sophia-Antipolis Cedex, vol. Ran WG1, No. e-Meeting, Apr. 12, 2021-Apr. 20, 2021, Apr. 7, 2021, XP052178013, p. 9, pp. 1-12.

* cited by examiner

1600

SEMI-PERSISTENT SCHEDULED FEEDBACK DEFERRAL WITH CARRIER SWITCHING IN UPLINK CARRIER AGGREGATION

CROSS REFERENCE

The present Application is a 371 national stage filing of International PCT Application No. PCT/US2022/034791 by HUANG et al. entitled "SEMI-PERSISTENT SCHEDULED FEEDBACK DEFERRAL WITH CARRIER SWITCHING IN UPLINK CARRIER AGGREGATION," filed Jun. 23, 2022; and claims priority to Greek patent application No. 20210100460 by HUANG et al., entitled "SEMI-PERSISTENT SCHEDULED FEEDBACK DEFERRAL WITH CARRIER SWITCHING IN UPLINK CARRIER AGGREGATION," filed Jul. 8, 2021, each of which is assigned to the assignee hereof, and each of which is expressly incorporated by reference in its entirety herein.

FIELD OF TECHNOLOGY

The present disclosure relates to wireless communications, including semi-persistent scheduled (SPS) feedback deferral with carrier switching in uplink carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may configure UEs for feedback transmission. For example, a base station may configure a UE to transmit feedback to the base station during a first time duration. In some cases, however, there may be insufficient available resources for transmission of the feedback. As such, in some examples, feedback transmission techniques may be deficient.

SUMMARY

The described techniques relate to improved methods, systems, devices, and apparatuses that support semi-persistent scheduled (SPS) feedback deferral with carrier switching in uplink carrier aggregation. Generally, the described techniques provide for a user equipment (UE) implementing physical uplink control channel (PUCCH) carrier switching and SPS feedback deferral to transmit feedback information for an SPS transmission. In some examples, a UE may monitor a first slot for an SPS transmission on a first serving cell (e.g., component carrier) of multiple serving cells in a PUCCH group. The UE may be configured to transmit feedback information for the SPS transmission in a target slot on a target serving cell. The UE may select either the target slot or a subsequent second slot (e.g., subsequent to the target slot) for transmission of the feedback information based on an availability of uplink resources on the multiple serving cells in the target slot. The UE may transmit the feedback information (e.g., to a base station) on either the target slot or the subsequent second slot based on the selection.

A method for wireless communication at a UE is described. The method may include monitoring a first slot for an SPS transmission on a first serving cell of a set of multiple serving cells in a PUCCH group, where the SPS transmission is associated with a target slot for feedback information, selecting between the target slot and a subsequent second slot to transmit the feedback information for the SPS transmission, where the selecting is in accordance with an availability of uplink resources on the set of multiple serving cells during the target slot, and transmitting, to a base station, the feedback information for the SPS transmission on the target slot or the subsequent second slot according to the selection.

An apparatus for wireless communication at a UE is described. The apparatus may include a processor, memory coupled with the processor, and instructions stored in the memory. The instructions may be executable by the processor to cause the apparatus to monitor a first slot for an SPS transmission on a first serving cell of a set of multiple serving cells in a PUCCH group, where the SPS transmission is associated with a target slot for feedback information, select between the target slot and a subsequent second slot to transmit the feedback information for the SPS transmission, where the selecting is in accordance with an availability of uplink resources on the set of multiple serving cells during the target slot, and transmit, to a base station, the feedback information for the SPS transmission on the target slot or the subsequent second slot according to the selection.

Another apparatus for wireless communication at a UE is described. The apparatus may include means for monitoring a first slot for an SPS transmission on a first serving cell of a set of multiple serving cells in a PUCCH group, where the SPS transmission is associated with a target slot for feedback information, means for selecting between the target slot and a subsequent second slot to transmit the feedback information for the SPS transmission, where the selecting is in accordance with an availability of uplink resources on the set of multiple serving cells during the target slot, and means for transmitting, to a base station, the feedback information for the SPS transmission on the target slot or the subsequent second slot according to the selection.

A non-transitory computer-readable medium storing code for wireless communication at a UE is described. The code may include instructions executable by a processor to monitor a first slot for an SPS transmission on a first serving cell of a set of multiple serving cells in a PUCCH group, where the SPS transmission is associated with a target slot for feedback information, select between the target slot and a subsequent second slot to transmit the feedback information for the SPS transmission, where the selecting is in accordance with an availability of uplink resources on the set of multiple serving cells during the target slot, and transmit, to a base station, the feedback information for the SPS transmission on the target slot or the subsequent second slot according to the selection.

Some examples of the method, apparatuses, and non-transitory computer-readable medium described herein may further include operations, features, means, or instructions for selecting a target serving cell of the set of multiple serving cells based on a time pattern according to a first reference numerology, where selecting between the target slot and the subsequent second slot to transmit the feedback information for the SPS transmission may be in accordance with the availability of uplink resources on the target serving cell.

Some examples of the method, apparatuses, and non-transitory computer-readable medium described herein may further include operations, features, means, or instructions for identifying, for the target serving cell during the target slot, a scheduling conflict between uplink transmission of the feedback information and a downlink reception and scanning, according to a predefined ordering, remaining serving cells of the set of multiple serving cells for the availability of uplink resources to transmit the feedback information, where selecting between the target slot and the subsequent second slot to transmit the feedback information for the SPS transmission may be in accordance with the availability of uplink resources on at least one serving cell of the remaining serving cells during the target slot.

Some examples of the method, apparatuses, and non-transitory computer-readable medium described herein may further include operations, features, means, or instructions for selecting a target serving cell of the set of multiple serving cells based on a time pattern according to a first reference numerology, identifying, for the target slot, a scheduling conflict between uplink transmission of the feedback information and a downlink reception, and deferring transmission of the feedback information to the subsequent second slot based on identifying the scheduling conflict, where selecting the subsequent second slot may be in accordance with the availability of uplink resources on the set of multiple serving cells.

Some examples of the method, apparatuses, and non-transitory computer-readable medium described herein may further include operations, features, means, or instructions for identifying a maximum deferral value for each serving cell of the set of multiple serving cells, where deferring transmission of the feedback information may be based on identifying the maximum deferral value.

Some examples of the method, apparatuses, and non-transitory computer-readable medium described herein may further include operations, features, means, or instructions for identifying the target slot based on a delay parameter according to a second reference numerology, where deferring transmission of the feedback information may be based on identifying the target slot.

In some examples of the method, apparatuses, and non-transitory computer-readable medium described herein, the first reference numerology uses the first serving cell as a reference and the second reference numerology uses a second serving cell as a reference.

In some examples of the method, apparatuses, and non-transitory computer-readable medium described herein, the second serving cell includes at least one of a serving cell with a largest numerology among the set of multiple serving cells in the PUCCH group, a serving cell with a smallest numerology among the set of multiple serving cells in the PUCCH group, a primary cell of the set of multiple serving cells in the PUCCH group, or a combination thereof.

In some examples of the method, apparatuses, and non-transitory computer-readable medium described herein, the first reference numerology and the second reference numerology use a second serving cell as a reference.

In some examples of the method, apparatuses, and non-transitory computer-readable medium described herein, the first reference numerology includes a numerology of a primary cell of the set of multiple serving cells in the PUCCH group, and the second reference numerology includes a numerology of a serving cell having a largest numerology among the set of multiple serving cells in the PUCCH group.

Some examples of the method, apparatuses, and non-transitory computer-readable medium described herein may further include operations, features, means, or instructions for identifying a subset of serving cells of the set of multiple serving cells that may be configured for deferred transmission on the subsequent second slot and selecting a second target serving cell of the subset of serving cells for transmission of the feedback information on the subsequent second slot based on the time pattern.

Some examples of the method, apparatuses, and non-transitory computer-readable medium described herein may further include operations, features, means, or instructions for transmitting, to the base station, the feedback information on the second target serving cell and on the subsequent second slot in accordance with an availability of uplink resources on the second target serving cell during the subsequent second slot.

Some examples of the method, apparatuses, and non-transitory computer-readable medium described herein may further include operations, features, means, or instructions for identifying, for the second target serving cell during the subsequent second slot, a second scheduling conflict between uplink transmission of the feedback information and a downlink reception, scanning, according to a predefined ordering, remaining serving cells of the subset of serving cells based on identifying the second scheduling conflict, and transmitting the feedback information to the base station on one of the remaining serving cells during the subsequent second slot or deferring transmission of the feedback information to a subsequent third slot in accordance with an availability of uplink resources on the remaining serving cells during the subsequent second slot.

In some examples of the method, apparatuses, and non-transitory computer-readable medium described herein, the subset of serving cells configured for deferred transmission on the subsequent second slot includes the set of multiple serving cells.

Some examples of the method, apparatuses, and non-transitory computer-readable medium described herein may further include operations, features, means, or instructions for generating the feedback information for the SPS transmission based on the monitoring, where selecting between the target slot and the subsequent second slot may be based on generating the feedback information.

In some examples of the method, apparatuses, and non-transitory computer-readable medium described herein, the first serving cell may be a primary cell and remaining serving cells of the set of multiple serving cells may be secondary cells.

A method for wireless communication at a base station is described. The method may include transmitting, to a UE, an SPS transmission on a first slot and a first serving cell of a set of multiple serving cells in a PUCCH group, where the SPS transmission is associated with a target slot for feedback information, and receiving, from the UE, the feedback information for the SPS transmission on a target slot or a subsequent second slot, where either the target slot or the subsequent second slot is selected in accordance with an availability of uplink resources on the set of multiple serving cells during the target slot.

An apparatus for wireless communication at a base station is described. The apparatus may include a processor, memory coupled with the processor, and instructions stored in the memory. The instructions may be executable by the processor to cause the apparatus to transmit, to a UE, an SPS transmission on a first slot and a first serving cell of a set of multiple serving cells in a PUCCH group, where the SPS transmission is associated with a target slot for feedback information and receive, from the UE, the feedback information for the SPS transmission on a target slot or a subsequent second slot, where either the target slot or the subsequent second slot is selected in accordance with an availability of uplink resources on the set of multiple serving cells during the target slot.

Another apparatus for wireless communication at a base station is described. The apparatus may include means for transmitting, to a UE, an SPS transmission on a first slot and a first serving cell of a set of multiple serving cells in a PUCCH group, where the SPS transmission is associated with a target slot for feedback information and means for receiving, from the UE, the feedback information for the SPS transmission on a target slot or a subsequent second slot, where either the target slot or the subsequent second slot is selected in accordance with an availability of uplink resources on the set of multiple serving cells during the target slot.

A non-transitory computer-readable medium storing code for wireless communication at a base station is described. The code may include instructions executable by a processor to transmit, to a UE, an SPS transmission on a first slot and a first serving cell of a set of multiple serving cells in a PUCCH group, where the SPS transmission is associated with a target slot for feedback information and receive, from the UE, the feedback information for the SPS transmission on a target slot or a subsequent second slot, where either the target slot or the subsequent second slot is selected in accordance with an availability of uplink resources on the set of multiple serving cells during the target slot.

Some examples of the method, apparatuses, and non-transitory computer-readable medium described herein may further include operations, features, means, or instructions for configuring the UE to select a target serving cell of the set of multiple serving cells based on a time pattern according to a first reference numerology, where the target slot may be selected in accordance with the availability of uplink resources on the target serving cell.

Some examples of the method, apparatuses, and non-transitory computer-readable medium described herein may further include operations, features, means, or instructions for identifying, for the target serving cell during the target slot, a scheduling conflict between uplink transmission of the feedback information and a downlink reception and configuring the UE to scan, according to a predefined ordering, remaining serving cells of the set of multiple serving cells for the availability of uplink resources to transmit the feedback information, where the target slot may be selected in accordance with the availability of uplink resources on at least one serving cell of the remaining serving cells during the target slot.

Some examples of the method, apparatuses, and non-transitory computer-readable medium described herein may further include operations, features, means, or instructions for configuring the UE to select a target serving cell of the set of multiple serving cells based on a time pattern according to a first reference numerology, identifying, for the target slot, a scheduling conflict between uplink transmission of the feedback information and a downlink reception, and configuring the UE to defer transmission of the feedback information to the subsequent second slot based on identifying the scheduling conflict, where the subsequent second slot may be selected in accordance with the availability of uplink resources on the set of multiple serving cells.

Some examples of the method, apparatuses, and non-transitory computer-readable medium described herein may further include operations, features, means, or instructions for identifying the target slot based on a delay parameter according to a second reference numerology, where the transmission of the feedback information may be deferred based on identifying the target slot.

In some examples of the method, apparatuses, and non-transitory computer-readable medium described herein, the first reference numerology uses the first serving cell as a reference and the second reference numerology uses a second serving cell as a reference.

In some examples of the method, apparatuses, and non-transitory computer-readable medium described herein, the second serving cell includes at least one of a serving cell with a largest numerology among the set of multiple serving cells in the PUCCH group, a serving cell with a smallest numerology among the set of multiple serving cells in the PUCCH group, a primary cell of the set of multiple serving cells in the PUCCH group, or a combination thereof.

In some examples of the method, apparatuses, and non-transitory computer-readable medium described herein, the first reference numerology and the second reference numerology use a second serving cell as a reference.

In some examples of the method, apparatuses, and non-transitory computer-readable medium described herein, the first reference numerology includes a numerology of a primary cell of the set of multiple serving cells in the PUCCH group, and the second reference numerology includes a numerology of a serving cell having a largest numerology among the set of multiple serving cells in the PUCCH group.

In some examples of the method, apparatuses, and non-transitory computer-readable medium described herein, the first serving cell may be a primary cell and remaining serving cells of the set of multiple serving cells may be secondary cells.

DETAILED DESCRIPTION

Figure 1:
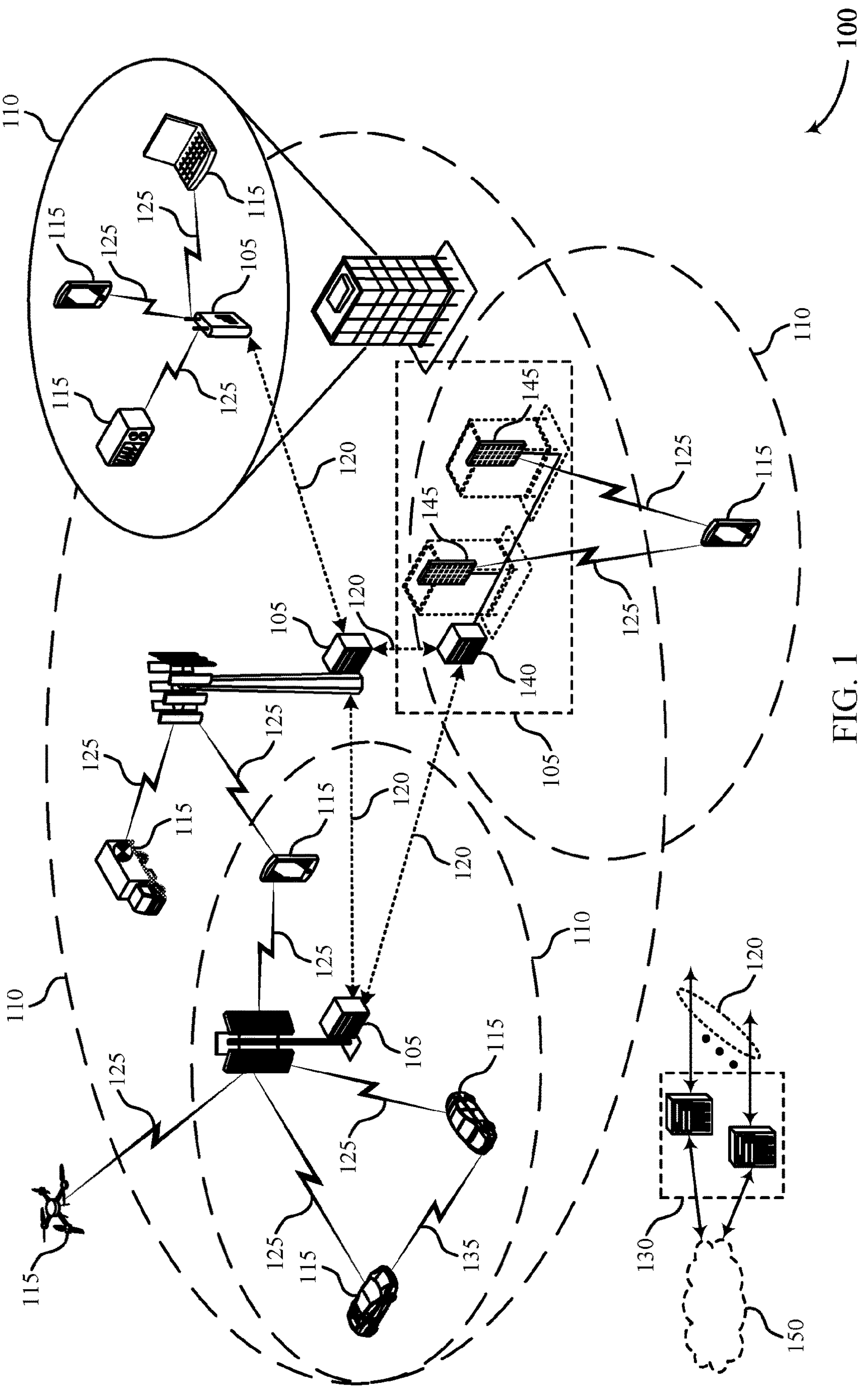
FIG. 1 illustrates an example of a wireless communications system that supports semi-persistent scheduled (SPS) feedback deferral with carrier switching in uplink carrier aggregation in accordance with aspects of the present disclosure.

In some wireless communications systems, a base station may transmit semi-persistent scheduled (SPS) transmissions to a user equipment (UE). In some examples, a UE may be configured with periodic resources for receiving SPS downlink transmissions. The base station may schedule the SPS transmissions via radio resource control (RRC) signaling (e.g., during an RRC configuration period) and may periodically transmit the SPS transmissions to the UE in accordance with the RRC signaling. In some cases, the base station may configure the UE to transmit feedback information (e.g., hybrid automatic repeat request (HARQ) acknowledgment (ACK) or negative acknowledgment (NACK) feedback) for the SPS transmissions. The UE may receive an SPS downlink transmission and may transmit feedback on one or more uplink symbols after receiving the SPS downlink transmission. For example, if the base station transmits an SPS transmission to the UE in a first slot, the base station may configure the UE to transmit feedback information for the SPS transmission in a target slot that is subsequent to the first slot. In some cases, the base station may transmit the SPS transmission to the UE on a first serving cell (e.g., component carrier) and may configure the UE to transmit the feedback information to the base station on a target serving cell (which may be the same or different from the first serving cell).

In some cases, however, a time-division duplexing (TDD) configuration associated with the target serving cell may prevent the UE from transmitting the feedback information to the base station in the target slot on the target serving cell. For example, if the target slot is designated as a downlink slot, the UE may be unable to transmit the feedback information in the target slot on the target serving cell. In other words, there may be insufficient available uplink resources for the UE to transmit the feedback information in the target slot on the target serving cell. In such cases, the UE may defer (e.g., delay) transmission of the feedback information to a subsequent second slot (e.g., subsequent to the target slot). Deferring transmission of the feedback information may increase the latency associated with reporting the feedback information to the base station.

In accordance with the techniques depicted herein, the UE may transmit the feedback information based on attempting to defer transmission of the feedback information to a different serving cell (e.g., different from the target serving cell) prior to deferring transmission of the feedback information to the subsequent second slot. For example, if there are insufficient available uplink resources for the UE to transmit the feedback information in the target slot on the target serving cell (e.g., if the UE identifies a scheduling conflict associated with the target slot and the target serving cell) but there are sufficient available uplink resources for transmission of the feedback information in the target slot on a second serving cell, the UE may transmit the feedback information on the second serving cell in the target slot. As a result, the UE may avoid incurring additional latency associated with delaying transmission of the feedback information to the subsequent second slot.

In some examples, the UE may select the target serving cell, the second serving cell, or both from a physical uplink control channel (PUCCH) group that includes a primary cell (e.g., a primary component carrier (PCC)) and one or more secondary cells (e.g., secondary component carriers (SCCs)). Additionally or alternatively, the UE may select the target serving cell, the second serving cell, or both based on a time pattern associated with the PUCCH group. The time pattern may indicate a designated serving cell (e.g., from the PUCCH group) for each slot in a time period. In some examples, the time pattern may be based on a first reference numerology of a serving cell in the PUCCH group. For example, the time pattern may be based on a first reference numerology of the first serving cell (e.g., on which the base station transmitted the SPS transmission), the target serving cell (e.g., on which the UE was scheduled to transmit the feedback information), or any other serving cell in the PUCCH group.

If the UE is unable to identify a target serving cell with sufficient available uplink resources for transmission of the feedback information in the target slot, the UE may defer transmission of the feedback information to the subsequent second slot. If there are insufficient available uplink resources for transmission of the feedback information in the subsequent second slot, the UE may continue deferring transmission of the feedback information until the UE identifies a slot and a serving cell with sufficient available uplink resources or until the UE reaches a maximum number of deferrals.

Aspects of the present disclosure may be implemented to realize one or more of the following advantages. The described techniques may enable a UE to transmit feedback information for SPS transmissions with reduced latency, among other benefits. For example, the described techniques may enable a UE to transmit feedback information for an SPS transmission in a target slot (e.g., on a different target serving cell) instead of delaying transmission of the feedback information to a subsequent second slot. Further, in some examples, the feedback transmission configuration as described herein may support higher data rates and diversity for control and data, thereby improving latency and reliability.

Aspects of the disclosure are initially described in the context of wireless communications systems, communications schemes, and process flows. Aspects of the disclosure are further illustrated by and described with reference to apparatus diagrams, system diagrams, and flowcharts that relate to SPS feedback deferral with carrier switching in uplink carrier aggregation.

FIG. 1 illustrates an example of a wireless communications system 100 that supports SPS feedback deferral with carrier switching in uplink carrier aggregation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support at least one of enhanced broadband communications, ultra-reliable (e.g., mission critical) communications, low latency communications, communications with low-cost and low-complexity devices, or a combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent second slot, or according to some other time interval.

In some wireless communications systems 100, a base station 105 may configure a UE 115 to transmit PUCCH transmissions on a PUCCH group that includes a primary cell and one or more secondary cells. Transmitting PUCCH transmissions on multiple serving cells (e.g., a primary cell and one or more serving cells) may also be referred to herein as PUCCH carrier switching. Each serving cell (e.g., component carrier) in the PUCCH group may be associated with a TDD configuration and a reference numerology. In some examples, the serving cells in the PUCCH group may be associated with different TDD configurations or the same TDD configuration. Similarly, the serving cells in the PUCCH group may be associated with different reference numerologies or the same reference numerology.

In some examples, the base station 105 may configure the UE 115 with a time pattern for the PUCCH group. The time pattern may indicate a designated serving cell for each slot in a time period. If the UE 115 is scheduled to transmit a PUCCH transmission in a slot, the UE 115 may transmit the PUCCH transmission on the designated serving cell for the slot. In some examples, if the base station 105 transmits an SPS physical downlink shared channel (PDSCH) transmission to the UE 115 in a first slot, the base station 105 may configure the UE 115 to transmit uplink feedback information (e.g., SPS ACK or NACK feedback) for the SPS PDSCH transmission in a target slot that is subsequent to the first slot. The UE 115 may identify the target slot based on receiving an indication of a timing offset (e.g., delay parameter) from the base station 105. The timing offset may indicate a number of slots between the first slot and the target slot. The timing offset (e.g., $K_1$), the time pattern, or both may be associated with a reference numerology of a serving cell in the PUCCH group. In some cases, the time pattern and the timing offset may be associated with the same reference numerology. In other cases, the time pattern and the timing offset may be associated with different reference numerologies.

In some cases, however, the UE 115 may be unable to transmit the feedback information (e.g., a PUCCH transmission) for the SPS PDSCH transmission in the target slot on the designated serving cell. For example, there may be insufficient uplink resources (e.g., PUCCH resources) for the UE 115 to transmit the feedback information in the target slot on the designated serving cell (e.g., based on a TDD configuration of the designated serving cell). In such cases, the UE 115 may defer transmission of the feedback information to a subsequent second slot (e.g., subsequent to the target slot). However, the UE 115 may only be able to defer transmission of the feedback information on the primary cell. In other words, the UE 115 may be unable to defer transmission of the feedback information to secondary cells in the PUCCH group. As such, the UE 115 may be unable to transmit deferred feedback information on secondary cells in the PUCCH group.

In accordance with aspects of the present disclosure, the UE 115 may transmit feedback information (e.g., HARQ ACK or NACK feedback) for an SPS PDSCH transmission with reduced latency and greater efficiency based on using a combination of PUCCH carrier switching and SPS feedback deferral techniques. For example, if the UE 115 determines that there are insufficient available uplink resources for transmission of the feedback information on a designated serving cell for a target slot, the UE 115 may check other serving cells (e.g., secondary cells) in a PUCCH group for uplink resource availability. If the UE 115 identifies a secondary cell with sufficient available uplink resources for transmission of the feedback information in the target slot, the UE 115 may defer transmission of the feedback information to the identified secondary cell. As such, the UE 115 may transmit the feedback information in the target slot on the identified secondary cell (e.g., instead of delaying transmission of the feedback information to a subsequent second slot), which may enable the UE to transmit the feedback information with reduced latency, among other benefits.

Figure 2:
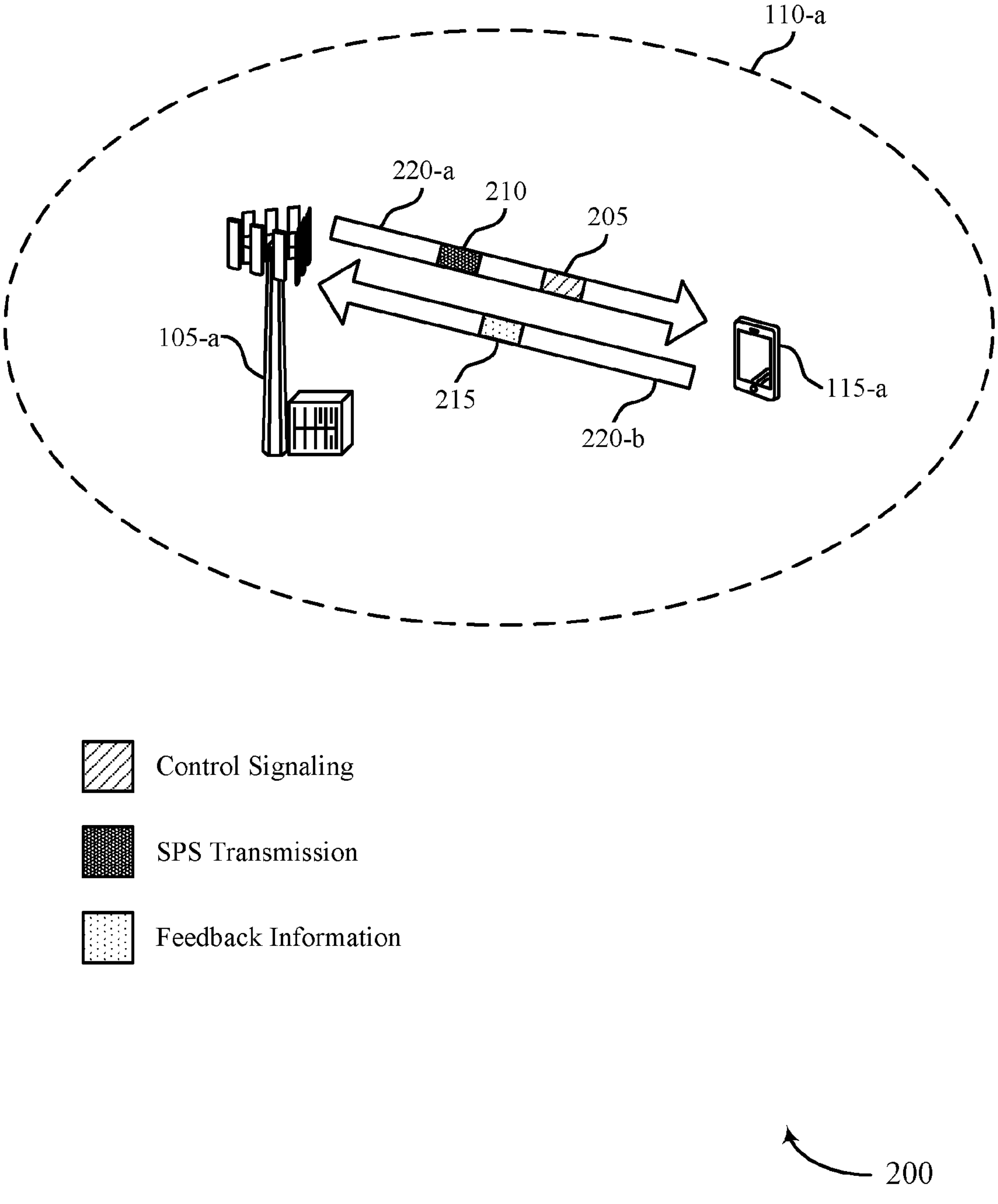
FIG. 2 illustrates an example of a wireless communications system that supports SPS feedback deferral with carrier switching in uplink carrier aggregation in accordance with aspects of the present disclosure.

FIG. 2 illustrates an example of a wireless communications system 200 that supports SPS feedback deferral with carrier switching in uplink carrier aggregation in accordance with aspects of the present disclosure. The wireless communications system 200 may implement or be implemented by aspects of wireless communications system 100. For example, the wireless communications system 200 may include a UE 115-*a* and a base station 105-*a*, which may be examples of corresponding devices described with reference to FIG. 1. The UE 115-*a* and the base station 105-*a* may communicate over a communication link 220-*a* (e.g., a downlink) and a communication link 220-*b* (e.g., an uplink), which may be examples of a communication link 125 described with reference to FIG. 1. The UE 115-*a* and the base station 105-*a* may communicate within a geographic coverage area 110-*a* of the base station 105-*a*, which may be an example of a geographic coverage area 110 described with reference to FIG. 1. In the wireless communications system 200, the UE 115-*a* may use PUCCH carrier switching and SPS feedback deferral techniques to transmit feedback information 215 to the base station 105-*a*.

In the wireless communications system 200, the base station 105-*a* may transmit control signaling 205 to the UE 115-*a*. The control signaling 205 may include RRC signaling, dynamic signaling (e.g., downlink control information (DCI), MAC-control elements (CEs)), or both. The control signaling 205 may schedule an SPS transmission 210 from the base station 105-*a* to the UE 115-*a* in a first slot. In some cases, the control signaling 205 may also configure the UE 115-*a* to transmit feedback information 215 for the SPS transmission 210 in a target slot. In some cases, however, the UE 115-*a* may be unable to transmit the feedback information 215 in the target slot. For example, there may be a scheduling conflict with the target slot that prevents the UE 115-*a* from transmitting the feedback information 215 in the target slot.

In accordance with aspects of the present disclosure, the UE 115-*a* may use PUCCH carrier switching (as described with reference to FIG. 1) and SPS feedback deferral techniques to transmit the feedback information 215 in a slot with available uplink resources. The UE 115-*a* may attempt to perform PUCCH carrier switching prior to performing an SPS feedback deferral. For example, the UE 115-*a* may identify a target slot for transmission of the feedback information 215 (e.g., HARQ ACK or NACK feedback). The UE 115-*a* may identify the target slot based on a timing offset (e.g., $K_1$) associated with a first reference numerology. In some examples, the first reference numerology may correspond to a serving cell (e.g., in the PUCCH group) with a largest SCS. In some examples, the control signaling 205 may include an indication of the timing offset, the first reference numerology, or both.

After identifying the target slot, the UE 115-*a* may determine a target serving cell (e.g., a target component carrier) on which to transmit the feedback information 215. The UE 115-*a* may determine the target serving cell based on a time pattern associated with a second reference numerology. In some examples, the second reference numerology may correspond to a serving cell with a smallest SCS. In other examples, the second reference numerology may be the same as the first reference numerology associated with the timing offset. In some examples, the control signaling 205 may include an indication of the time pattern, the second reference numerology, or both.

Once the UE 115-*a* identifies the target slot and determines the target serving cell, the UE 115-*a* may determine whether there are sufficient available uplink resources for transmission of the feedback information 215 in the target slot on the target serving cell. If the UE 115-*a* determines that the feedback information 215 can be transmitted in the target slot on the target serving cell, then the UE 115-*a* may transmit the feedback information 215 accordingly. Otherwise, the UE 115-*a* may trigger a deferral of the feedback information 215.

If the UE 115-*a* triggers SPS feedback deferral (e.g., if the UE 115-*a* is unable to transmit the feedback information 215 in the target slot on the target serving cell and triggers a deferral), the UE 115-*a* may scan serving cells in the PUCCH group based on a predefined ordering (which may be indicated in the control signaling 205). If a serving cell in the PUCCH group has uplink resources available for transmission of the feedback information 215, the UE 115-*a* may select the serving cell for transmission of the feedback information 215. If the UE 115-*a* determines that none of the serving cells in the PUCCH group have available uplink resources for transmission of the feedback information 215, the UE 115-*a* may defer transmission of the feedback information 215 to a subsequent second slot (e.g., subsequent to the target slot). In some examples, the UE 115-*a* may identify the subsequent second slot based on the first reference numerology associated with the timing offset.

In the subsequent second slot (e.g., the deferred target slot), the UE 115-*a* may perform a second PUCCH carrier switching procedure to determine if the feedback information 215 can be transmitted on any serving cells in the subsequent second slot. That is, the UE 115-*a* may identify a second target serving cell for the subsequent second slot and may attempt to transmit the feedback information 215 on the second target serving cell. If the UE 115-*a* is unable to transmit the feedback information on the second target serving cell during the subsequent second slot, the UE 115-*a* may scan other serving cells for available uplink resources. In some examples, the UE 115-*a* may be configured to perform the second PUCCH carrier switching procedure across a subset of serving cells in the PUCCH group. In other examples, the UE 115-*a* may be configured to perform the second PUCCH carrier switching procedure across all serving cells in the PUCCH group. If the UE 115-*a* determines that the feedback information 215 can be transmitting on another serving cell in the PUCCH group during the subsequent second slot, the UE 115-*a* may transmit the feedback information 215 accordingly. Otherwise, the UE 115-*a* may continue deferring the feedback information 215.

Using PUCCH carrier switching and SPS feedback deferral may enable the UE 115-*a* to transmit the feedback information 215 to the base station 105-*a* with reduced latency and increased efficiency, among other benefits. For example, the described techniques may enable the UE 115-*a* to transmit the feedback information 215 in the target slot on a different serving cell rather than delaying transmission of the feedback information 215 to a subsequent second slot.

Figure 3:
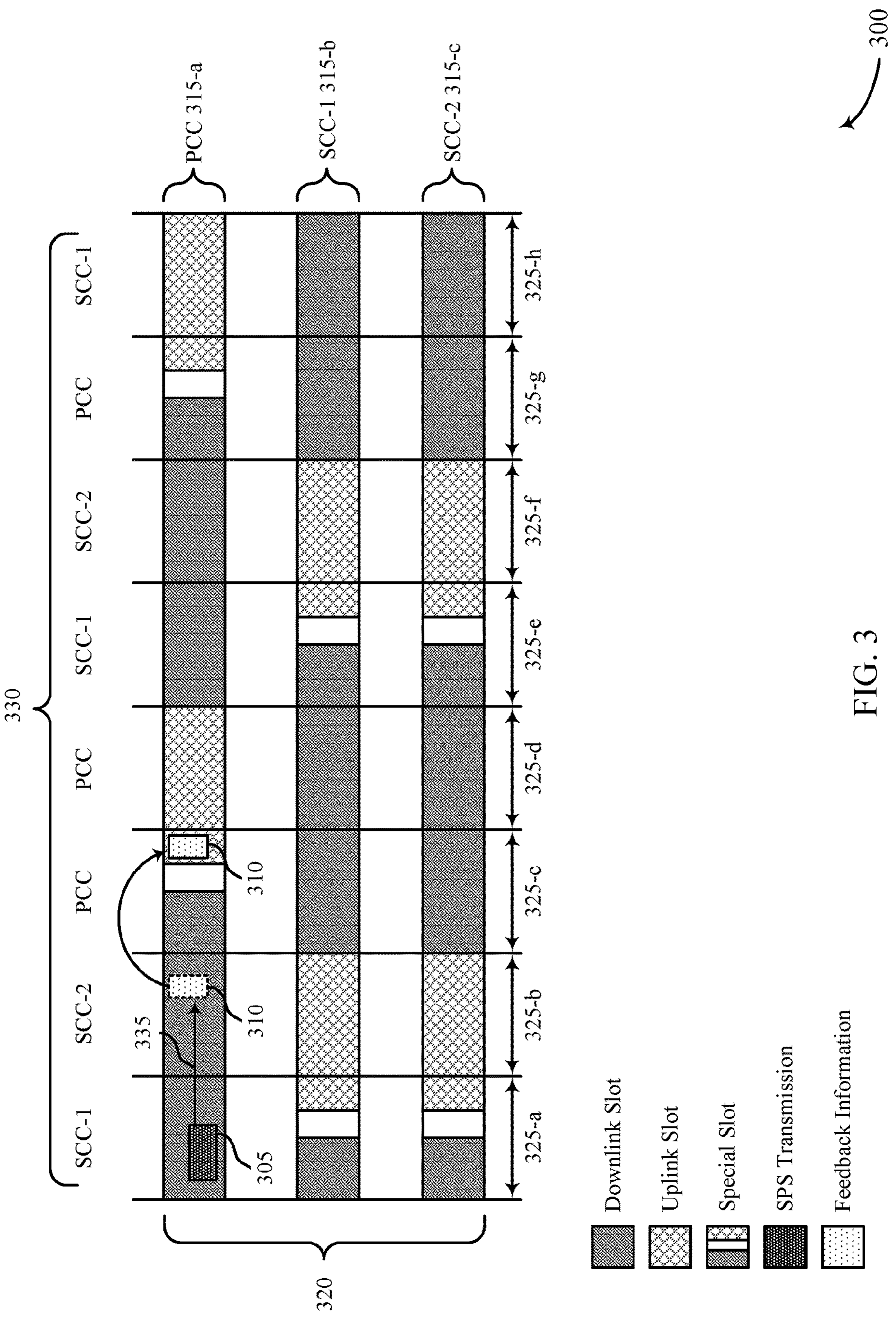
FIGS. 3-5 illustrate examples of communications schemes that support SPS feedback deferral with carrier switching in uplink carrier aggregation in accordance with aspects of the present disclosure.

FIG. 3 illustrates an example of a communications scheme 300 that supports SPS feedback deferral with carrier switching in uplink carrier aggregation in accordance with aspects of the present disclosure. The communications scheme 300 may implement or be implemented by aspects of the wireless communications system 100 or the wireless communications system 200. For example, the communications scheme 300 may be implemented by a UE 115 or a base station 105, which may be examples of corresponding devices described with reference to FIGS. 1 and 2. In the communications scheme 300, the UE 115 may defer transmission of feedback information 310 from a slot 325-*b* to a slot 325-*c* based on a time pattern 330 and a TDD configuration of a primary cell 315-*a*.

In the example of FIG. 3, the base station 105 may transmit an SPS transmission 305 to the UE 115. The base station 105 may schedule the SPS transmission 305 via control signaling (which may include RRC signaling, DCI, or MAC-CEs). In some examples, the control signaling may also configure the UE 115 to transmit feedback information 310 for the SPS transmission 305. For example, the control signaling may indicate at least one of a timing offset 335 between reception of the SPS transmission 305 and transmission of the feedback information 310, a time pattern 330 associated with a PUCCH group 320, a TDD configuration for each serving cell 315 in the PUCCH group 320, or a combination thereof. The timing offset 335 may indicate a number of slots between a slot 325-*a* in which the base station 105 transmits the SPS transmission 305 and a slot 325-*b* in which the UE 115 is scheduled to transmit the feedback information 310.

The time pattern 330 may indicate a target serving cell 315 (e.g., from the PUCCH group 320) for each of the slots 325. For example, the time pattern may indicate that a secondary cell 315-*b* (e.g., SCC-1) is the target serving cell 315 for slots 325-*a*, 325-*e*, and 325-*h*, a secondary cell 315-*c* (e.g., SCC-2) is the target serving cell 315 for slots 325-*b* and 325-*f*, and the primary cell 315-*a* (e.g., PCC) is the target serving cell 315 for slots 325-*c*, 325-*d*, and 325-*g*. Although illustrated with three serving cells 315 in the PUCCH group 320, it is to be understood that the PUCCH group 320 may include any number of serving cells 315. Likewise, it is to be understood that the time pattern 330 may include any number of target serving cells 315 arranged in any order.

The TDD configurations for the serving cells 315 may indicate slot types for each of the slots 325. For example, the TDD configuration of the primary cell 315-*a* may indicate that the slot 325-*a* is a downlink slot (e.g., a slot with downlink resources), the slot 325-*c* is a special slot (e.g., a slot with uplink resources and downlink resources), and the slot 325-*d* is an uplink slot (e.g., a slot with uplink resources). Although illustrated with a specific combination of uplink slots, downlink slots, and special slots, it is to be understood that the TDD configurations associated with the serving cells 315 may include any number of different slot types arranged in any combination.

In some cases, if the base station 105 configures the UE 115 to transmit the feedback information 310 in the slot 325-*b* on the primary cell 315-*a* but the TDD configuration associated with the primary cell 315-*a* indicates that the slot 325-*b* is a downlink slot, the UE 115 may be unable to transmit the feedback information 310 in the slot 325-*b*. In other words, there may be insufficient available uplink resources for transmission of the feedback information 310 in the slot 325-*b* on the primary cell 315-*a*. In such cases, the UE 115 may defer transmission of the feedback information 310 to a different slot 325. For example, the UE 115 may defer transmission of the feedback information 310 to the slot 325-*c* because the slot 325-*c* has sufficient available uplink resources for transmission of the feedback information 310 on the primary cell 315-*a*. Deferring transmission of the feedback information 310 to the slot 325-*c*, as illustrated in FIG. 3, may increase the latency associated with reporting the feedback information 310 to the base station 105.

In accordance with the described techniques, the UE 115 may transmit the feedback information 310 with reduced latency and greater efficiency based on using PUCCH carrier switching in combination with SPS feedback deferral techniques (as described with reference to FIGS. 1 and 2). For example, if the UE 115 determines that there are insufficient available uplink resources for transmission of the feedback information 310 in the slot 325-*b* on the primary cell 315-*a* (e.g., the target serving cell 315 for the slot 325-*c*, as indicated in the time pattern 330), the UE 115 may scan other serving cells in the PUCCH group 320 (e.g., the secondary cell 315-*b* and the secondary cell 315-*c*) prior to deferring transmission of the feedback information 310 to the slot 325-*c*. If the UE 115 determines that there are sufficient available uplink resources for transmission of the feedback information 310 in the slot 325-*b* (e.g., the target slot for the feedback information 310, as indicated by the timing offset 335) on either the secondary cell 315-*b* or the secondary cell 315-*c*, the UE 115 may defer transmission of the feedback information 310 to the secondary cell 315-*b* or the secondary cell 315-*c* (e.g., based on a preconfigured ordering for the serving cells 315). That is, the UE 115 may transmit the feedback information 310 in the slot 325-*b* on a different serving cell 315 rather than delaying transmission of the feedback information 310 to the slot 325-*c*. As a result, the UE 115 may transmit the feedback information 310 with reduced latency, among other benefits.

In some examples, if neither the secondary cell 315-*b* nor the secondary cell 315-*c* have sufficient available uplink resources for transmission of the feedback information 310 in the slot 325-*b*, the UE 115 may trigger SPS feedback deferral of the feedback information 310 to the slot 325-*c* and may perform another PUCCH carrier switching procedure to determine if any serving cells 315 in the PUCCH group 320 have sufficient available uplink resources for transmission of the feedback information 310 in the slot 325-*c*.

In some examples, the UE 115 may be configured with a first set of serving cells 315 for PUCCH carrier switching and a second set of serving cells 315 for SPS feedback deferral. For example, the UE 115 may be configured to transmit PUCCH HARQ feedback on the primary cell 315-*a*, the secondary cell 315-*b*, and the secondary cell 315-*c*, but may only be configured to perform SPS PUCCH HARQ deferral on the primary cell 315-*a* and the secondary cell 315-*b*. Thus, the UE 115 may perform PUCCH carrier switching (as described herein with reference to FIGS. 1 and 2) between the primary cell 315-*a*, the secondary cell 315-*b*, and the secondary cell 315-*c*, but may only defer transmission of the feedback information 310 to the primary cell 315-*a* or the secondary cell 315-*b*.

According to aspects depicted herein, the UE 115 may be configured with different sets of serving cells 315 for PUCCH carrier switching and SPS feedback deferral because SPS PUCCH HARQ deferral to a first available PUCCH may imply that uplink resources per serving cell 315 are reserved by a scheduling component at the base station 105 for a specific SPS PUCCH configuration. For example, the SPS PUCCH configuration for PUCCH HARQ transmitted via component carrier 0, component carrier 1, component carrier 2, but SPS PUCCH HARQ deferral may be allowed in component carrier 0 and component carrier 1. Hence rules for PUCCH carrier switching may be applicable for component carrier 0, component carrier 1 and component carrier for SPS PUCCH transmission and SPS PUCCH HARQ deferral rules may be applicable to component carrier 0 and component carrier 1 (as SPS PUCCH HARQ deferral to 1st available PUCCH implies that uplink resources per component carrier may be reserved for a specific SPS PUCCH configuration from the scheduler). Thus, if the scheduling component determines not to make resource reservations for all serving cells 315, the UE 115 may be unable to defer transmission of the feedback information 310 to some serving cells 315.

Additionally or alternatively, the UE 115 may be configured with a maximum deferral value (e.g., k1_def_max) for each serving cell 315. That is, the UE 115 may be configured with a first maximum deferral value (e.g., k1_def_max_0) for the primary cell 315-*a*, a second maximum deferral value (e.g., k1_def_max_1) for the secondary cell 315-*b*, and a third maximum deferral value (e.g., k1_def_max_2) for the secondary cell 315-*c*. These maximum deferral values may be indicated as a maximum number of deferrals, a maximum number of deferred slots based on a reference numerology (e.g., a third reference numerology), or a maximum time (e.g., in ms). In some examples, these maximum deferral values may have approximately the same value (e.g., k1_def_max_0≈k1_def_max_1≈k1_def_max_2). These maximum deferral values may be based on the base station 105 reserving PUCCH resources for different time periods per serving cell 315.

As an example, if the base station 105 configures the UE 115 to transmit SPS PUCCH on the primary cell 315-*a*, the secondary cell 315-*b*, and the secondary cell 315-*c*, these serving cells 315 may have 3 different TDD patterns at a specific time. For example, after the slot 325-*b*, the TDD pattern may indicate that the secondary cell 315-*b* and the secondary cell 315-*c* switch from uplink slots to downlink slots and the primary cell 315-*a* switches from a downlink slot to a special slot. As a result, the UE 115 may be unable to perform PUCCH carrier switching to the secondary cell 315-*b* or the secondary cell 315-*c*. In such examples, the base station 105 may configure the maximum deferral values based on the different TDD configuration patterns. In another example, a scheduling component of the base station 105 may be able to reserve the same PUCCH resource during different maximum deferral values across different serving cells 315. For example, the base station 105 may reserve PUCCH resources in four slots 325 for the primary cell 315-*a*, six slots 325 for the secondary cell 315-*b*, and eight slots 325 for the secondary cell 315-*c*.

Figure 4:
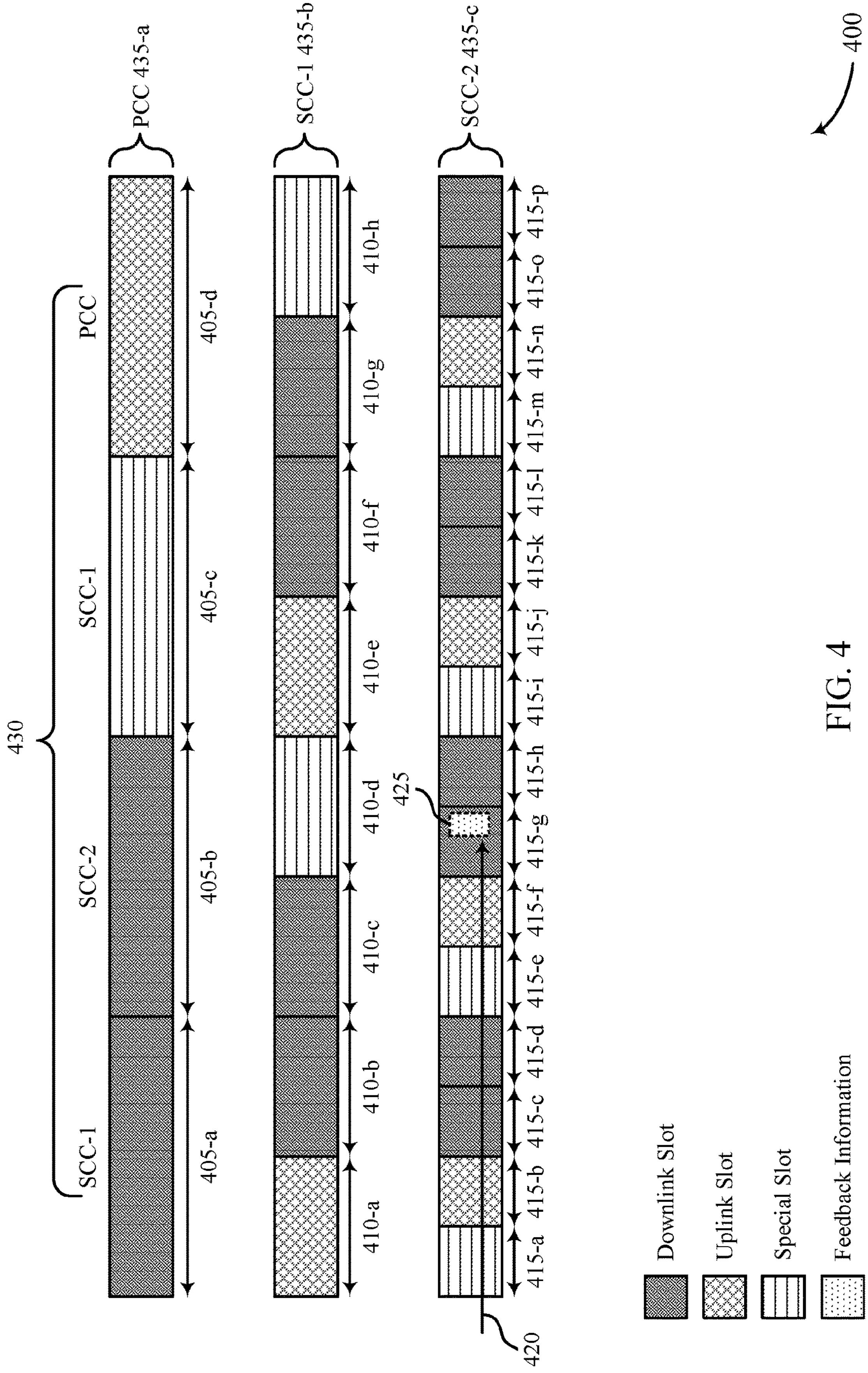

FIG. 4 illustrates an example of a communications scheme 400 that supports SPS feedback deferral with carrier switching in uplink carrier aggregation in accordance with aspects of the present disclosure. The communications scheme 400 may implement or be implemented by aspects of the wireless communications systems 100 and 200 or the communications scheme 300. For example, the communications scheme 400 may be implemented by a UE 115 or a base station 105, which may be examples of corresponding devices described with reference to FIGS. 1-3. In the communications scheme 400, the UE 115 may defer transmission of feedback information 425 from a secondary cell 435-*c* (e.g., SCC-2) to a secondary cell 435-*b* (e.g., SCC-1) based on a timing offset 420, a time pattern 430, and TDD configurations associated with serving cells 435.

In the example of FIG. 4, the base station 105 may schedule an SPS transmission to the UE 115 via RRC signaling and may transmit the SPS transmission to the UE 115 in accordance with the RRC signaling. In some examples, the base station 105 may configure the UE 115 to transmit feedback information 425 for the SPS transmission based on transmitting control signaling (e.g., DCI, MAC-CEs) to the UE 115. The control signaling may indicate at least one of the timing offset 420, the time pattern 430, the TDD configurations associated with the serving cells 435, or a combination thereof.

The timing offset 420 may indicate a number of slots between a first slot in which the base station 105 transmits the SPS transmission and a target slot (e.g., a slot 415-*g*) in which the UE 115 is scheduled to transmit the feedback information 425 (e.g., SPS HARQ feedback) for the SPS transmission. The timing offset 420 may be based on a first reference numerology corresponding to one of the serving cells 435. In some examples, the first reference numerology may correspond to a serving cell 435 with the largest SCS (and shortest slot duration). For example, if an SCS of the secondary cell 435-*c* is larger than an SCS of a primary cell 435-*a* (e.g., PCC) and an SCS of the secondary cell 435-*b*, the first reference numerology may correspond to the secondary cell 435-*c*. That is, the timing offset 420 may use the secondary cell 435-*c* as a reference.

Likewise, the time pattern 430 may be based on a second reference numerology corresponding to a serving cell 435 with the smallest SCS (and largest slot duration). For example, if the SCS of the primary cell 435-*a* is smaller than the SCS of the secondary cell 435-*b* and the SCS of the secondary cell 435-*c*, the time pattern 430 may be based on the SCS of the primary cell 435-*a*. That is, the time pattern 430 may use the primary cell 435-*a* as a reference. The time pattern 430 may indicate a target serving cell 435 (e.g., of the serving cells 435) for each slot 405 associated with the primary cell 435-*a* (as well as slots 410 and slots 415 that overlap in time with the slots 405). For example, the time pattern 430 may indicate that the secondary cell 435-*b* is the target serving cell 435 for slots 405-*a*, 410-*a*, 410-*b*, 415-*a*, 415-*b*, 415-*c*, 415-*d*, 405-*c*, 410-*e*, 410-*f*, 415-*i*, 415-*j*, 415-*k*, and 415-*l*. As depicted herein, the secondary cell 435-*c* is the target serving cell 435 for slots 405-*b*, 410-*c*, 410-*d*, 415-*e*, 415-*f*, 415-*g*, and 415-*h*, and the primary cell 435-*a* is the target serving cell 435 for slots 405-*d*, 410-*g*, 410-*h*, 415-*m*, 415-*n*, 415-*o*, and 415-*p*.

The TDD configurations may indicate slot types for the slots 405 corresponding to the primary cell 435-*a*, the slots 410 corresponding to the secondary cell 435-*b*, and the slots 415 corresponding to the secondary cell 435-*c*. For example, the TDD configuration associated with the primary cell 435-*a* may indicate that the slots 405-*a* and 405-*b* are downlink slots, the slot 405-*c* is a special slot, and the slot 405-*d* is an uplink slot. In some examples, the serving cells 435 may have different slot types that overlap in time. For example, the slot 405-*d* (e.g., an uplink slot) may overlap in time with the slot 410-*g* (e.g., a downlink slot). In some examples, the TDD configurations associated with the serving cells 435 may be configured via RRC signaling or dynamic signaling (e.g., DCI, MAC-CEs).

After the UE 115 receives the SPS transmission from the base station 105, the UE 115 may determine a target slot for transmitting the feedback information 425 based on the timing offset 420. For example, if the UE 115 receives the SPS transmission from the base station 105 prior to the slot 415-*a* and the timing offset 420 is based on a reference numerology of the secondary cell 435-*c* (e.g., because the secondary cell 435-*c* has the largest SCS), the UE 115 may determine that the slot 415-*g* is the target slot for transmission of the feedback information 425.

Once the UE 115 has identified the target slot (e.g., the slot 415-*g*) for transmission of the feedback information 425, the UE 115 may determine a target serving cell 435 for the feedback information 425 based on the time pattern 430. For example, if the time pattern 430 is based on a reference numerology of the primary cell 435-*a* (e.g., because the primary cell 435-*a* has the smallest SCS) and the time pattern 430 indicates that the secondary cell 435-*c* is the target serving cell 435 for the slot 415-*g* (e.g., because the slot 415-*g* overlaps in time with the slot 405-*b*), the UE 115 may select the secondary cell 435-*c* and the slot 415-*g* for transmission of the feedback information 425.

If the UE 115 can transmit the feedback information 425 in the target slot on the target serving cell 435 (e.g., if there are sufficient available uplink resources), the UE 115 may transmit the feedback information 425 accordingly (e.g., without SPS feedback deferral). In some examples, however, the UE 115 may be unable to transmit the feedback information 425 in the target slot on the target serving cell 435. For example, if the slot 415-*g* is designated as a downlink slot (e.g., based on a TDD configuration associated with the secondary cell 435-*c*), there may be insufficient available uplink resources for transmission of the feedback information 425 in the slot 415-*g* on the secondary cell 435-*c*.

If the UE 115 is unable to transmit the feedback information 425 in the target slot on the target serving cell 435, the UE 115 may initiate (e.g., trigger) SPS feedback deferral of the feedback information 425. Specifically, the UE 115 may scan remaining serving cells 435 (e.g., the secondary cell 435-*b* and the primary cell 435-*a*) to determine if there are sufficient available uplink resources for transmission of the feedback information 425 in these slots. In some examples, the UE 115 may scan the remaining serving cells 435 based on a predefined ordering. If the UE 115 identifies a serving cell 435 with sufficient available uplink resources for transmission of the feedback information 425, the UE 115 may select the identified serving cell 435 and the target slot for transmission of the feedback information 425. Otherwise, the UE 115 may defer the feedback information 425 to a subsequent target slot based on the first reference numerology used for interpretation of the timing offset 420 (e.g., the reference numerology corresponding to the secondary cell 435-*c*). In the subsequent target slot, the UE 115 may perform additional iterations of PUCCH carrier switching (e.g., identifying a target serving cell 435, determining resource availability) and SPS feedback deferral (e.g., scanning remaining serving cells 435, deferring transmission to a subsequent second slot) until the UE 115 identifies suitable time and frequency resources for transmission of the feedback information 425.

As an example, if the UE 115 determines that there are insufficient available uplink resources for transmission of the feedback information 425 in the slot 415-*g* on the secondary cell 435-*c*, the UE 115 may scan the remaining serving cells 435 and determine that the secondary cell 435-*b* has sufficient available uplink resources for transmission of the feedback information 425 in the slot 410-*d* (which overlaps in time with the slot 415-*g*). As such, the UE 115 may select the secondary cell 435-*b* and the slot 410-*d* for transmission of the feedback information 425 instead of deferring the feedback information 425 to a subsequent second slot 415. The described techniques may enable the UE 115 to transmit the feedback information 425 to the base station 105 with reduced latency, among other benefits. For example, using PUCCH carrier switching in combination with SPS feedback deferral may enable the UE to transmit the feedback information 425 without delaying the feedback information 425 to a subsequent second slot 415.

Figure 5:
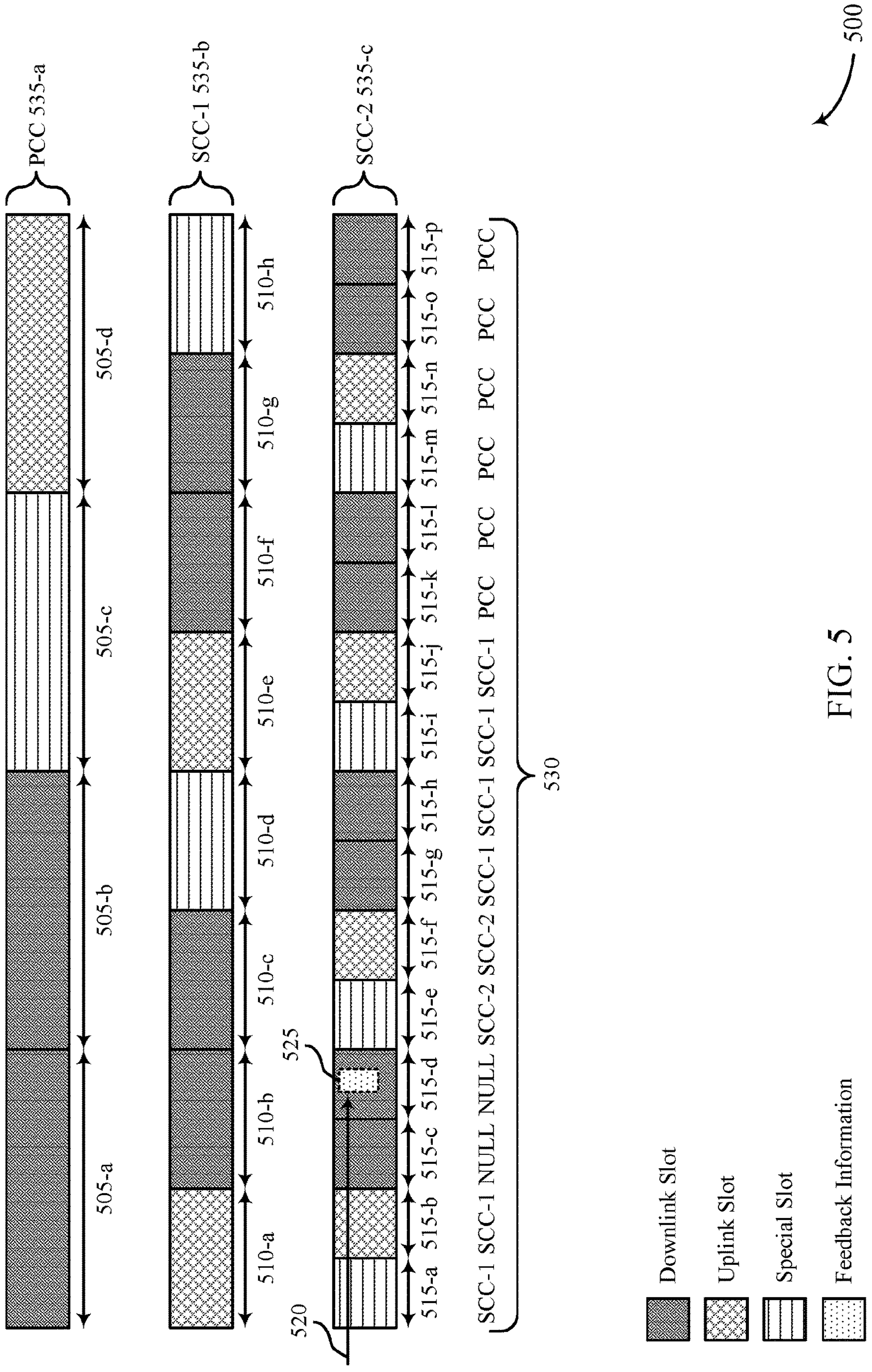

FIG. 5 illustrates an example of a communications scheme 500 that supports SPS feedback deferral with carrier switching in uplink carrier aggregation in accordance with aspects of the present disclosure. The communications scheme 500 may implement or be implemented by aspects of the wireless communications systems 100 and 200 or the communications schemes 300 and 400. For example, the communications scheme 500 may be implemented by a UE 115 or a base station 105, which may be examples of corresponding devices described with reference to FIGS. 1-4. In the communications scheme 500, the UE 115 may defer transmission of feedback information 525 from a slot 515-*d* to a slot 515-*e* based on a time pattern 530, a timing offset 520, and TDD configurations associated with serving cells 535.

In the example of FIG. 5, the base station 105 may schedule an SPS transmission to the UE 115 via RRC signaling and may transmit the SPS transmission to the UE 115 in accordance with the RRC signaling. In some examples, the base station 105 may configure the UE 115 to transmit feedback information 525 for the SPS transmission based on transmitting control signaling (e.g., DCI, MAC-CEs) to the UE 115. The control signaling may indicate at least one of the timing offset 520, the time pattern 530, the TDD configurations associated with the serving cells 535, or a combination thereof.

The timing offset 520 may indicate a number of slots between a first slot in which the base station 105 transmits the SPS transmission and a target slot (e.g., a slot 515-*d*) in which the UE 115 is scheduled to transmit the feedback information 525. The timing offset 520 may be based on a reference numerology corresponding to one of the serving cells 535. In some examples, the timing offset 520 may be based on a reference numerology corresponding to a serving cell 535 with the largest SCS (and shortest slot duration). For example, if an SCS of a secondary cell 535-*c* (e.g., SCC-2) is larger than an SCS of the primary cell 535-*a* (e.g., PCC) and an SCS of the secondary cell 535-*b* (e.g., SCC-1), the timing offset 520 may be based on a reference numerology of the secondary cell 535-*c*. That is, the timing offset 520 may use the secondary cell 535-*c* as a reference.

Likewise, the time pattern 530 may be based on a reference numerology corresponding to the serving cell 535 with the largest SCS (e.g., the secondary cell 535-*c*). That is, both the timing offset 520 and the time pattern 530 may use the secondary cell 535-*c* as a reference. The time pattern 530 may indicate a target serving cell 535 for each slot 515 associated with the secondary cell 535-*c* (as well as slots 505 and slots 510 that overlap in time with the slots 515). For example, the time pattern 530 may indicate that the secondary cell 535-*b* is the target serving cell 535 for slots 515-*a*, 515-*b*, 515-*g*, 515-*h*, and 515-*i*, the secondary cell 535-*c* is the target serving cell 535 for slots 515-*e* and 515-*f*, and the primary cell 535-*a* is the target serving cell 535 for slots 515-*k*, 515-*l*, 515-*m*, 515-*n*, 515-*o*, and 515-*p*.

The TDD configurations may indicate slot types for the slots 505 corresponding to the primary cell 535-*a*, the slots 510 corresponding to the secondary cell 535-*b*, and the slots 515 corresponding to the secondary cell 535-*c*. For example, the TDD configuration associated with the primary cell 535-*a* may indicate that the slots 505-*a* and 505-*b* are downlink slots, the slot 505-*c* is a special slot, and the slot 505-*d* is an uplink slot. Likewise, the TDD configuration associated with the secondary cell 535-*b* may indicate that slots 510-*b*, 510-*c*, 510-*f*, and 510-*g* are downlink slots, slots 510-*a* and 510-*e* are uplink slots, and slots 510-*d* and 510-*h* are special slots. In some examples, the secondary cells 535 may have different slot types corresponding to the same time period. For example, the slot 505-*d* (e.g., an uplink slot) may overlap in time with the slot 510-*g* (e.g., a downlink slot). In some examples, the TDD configurations associated with the serving cells 535 may be configured via RRC signaling or dynamic signaling (e.g., DCI, MAC-CEs).

In some cases, if a slot 515 (and slots that overlap with the slot 515 in the time domain) has no available uplink resources, the time pattern 530 may indicate a NULL value for the slot 515. For example, the time pattern 530 may indicate a NULL value for slots 515-*c* and 515-*d* because these slots (along with the slots 505 and 510 that overlap with these slots 515 in the time domain) are downlink slots, as indicated by the TDD configurations. As such, these slots may not have available uplink resources for PUCCH transmissions.

After the UE 115 receives the SPS transmission from the base station 105, the UE 115 may determine a target slot for transmitting the feedback information 525 based on the timing offset 520. For example, if the UE 115 receives the SPS transmission from the base station 105 prior to the slot 515-*a* and the timing offset 520 is based on a reference numerology corresponding to the secondary cell 535-*c* (e.g., because the secondary cell 535-*c* has the largest SCS), the UE 115 may determine that the slot 515-*d* is the target slot for transmission of the feedback information 525.

Once the UE 115 has identified the target slot (e.g., the slot 515-*d*) for the feedback information 525, the UE 115 may determine a target serving cell 535 for the feedback information 525 based on the time pattern 530. In the example of FIG. 5, neither the slot 515-*d* nor the slots 510-*b* and 505-*a* (that overlap in time with the slot 515-*d*) have any available uplink resources (e.g., because these slots are downlink slots). As such, the time pattern 530 may indicate a NULL value for the target serving cell 535 in the slot 515-*d*. The UE 115 may initiate SPS feedback deferral of the feedback information 525 based on the indicated NULL value for the slot 515-*d*. In some examples, the UE 115 may refrain from scanning remaining serving cells 535 (e.g., as described with reference to FIG. 4) based on the indicated NULL value because the NULL value may indicate that none of the serving cells 535 have available uplink resources in the target slot.

In some examples, the UE 115 may refrain from scanning the remaining serving cells 535 when the time pattern 530 is based on the reference numerology of the serving cell 535 with the largest SCS (e.g., the secondary cell 535-*c*) because the time pattern 530 may have a relatively high granularity. That is, the UE 115 may trigger SPS feedback deferral without checking other serving cells 535 (e.g., for available uplink resources) if the time pattern 530 is associated with relatively short slot durations. As a result, using a time pattern 530 (and a timing offset 520) that corresponds to the largest SCS of the serving cells 535 may enable the UE 115 to avoid power consumption and processing costs associated with scanning the remaining serving cells 535.

In other examples, if the UE 115 is unable to transmit the feedback information 525 in the target slot on the target serving cell 535, the UE 115 may initiate (e.g., trigger) SPS feedback deferral of the feedback information 525. Specifically, the UE 115 may scan remaining serving cells 535 (e.g., the secondary cell 535-*b* and the primary cell 535-*a*) to determine if there are sufficient available uplink resources for transmission of the feedback information 525 in these slots. In some examples, the UE 115 may scan the remaining serving cells 535 based on a predefined ordering. If the UE 115 identifies a serving cell 535 with sufficient available uplink resources for transmission of the feedback information 525, the UE 115 may select the identified serving cell 535 and the target slot for transmission of the feedback information 525. Otherwise, the UE 115 may defer the feedback information 525 to a subsequent target slot based on the reference numerology used for interpretation of the timing offset 520 (e.g., the reference numerology corresponding to the secondary cell 535-*c*). In the subsequent target slot, the UE 115 may perform additional iterations of PUCCH carrier switching (e.g., identifying a target serving cell 535, determining resource availability) and SPS feedback deferral (e.g., scanning remaining serving cells 535, deferring transmission to a subsequent second slot) until the UE 115 identifies suitable time and frequency resources for transmission of the feedback information 525.

Figure 6:
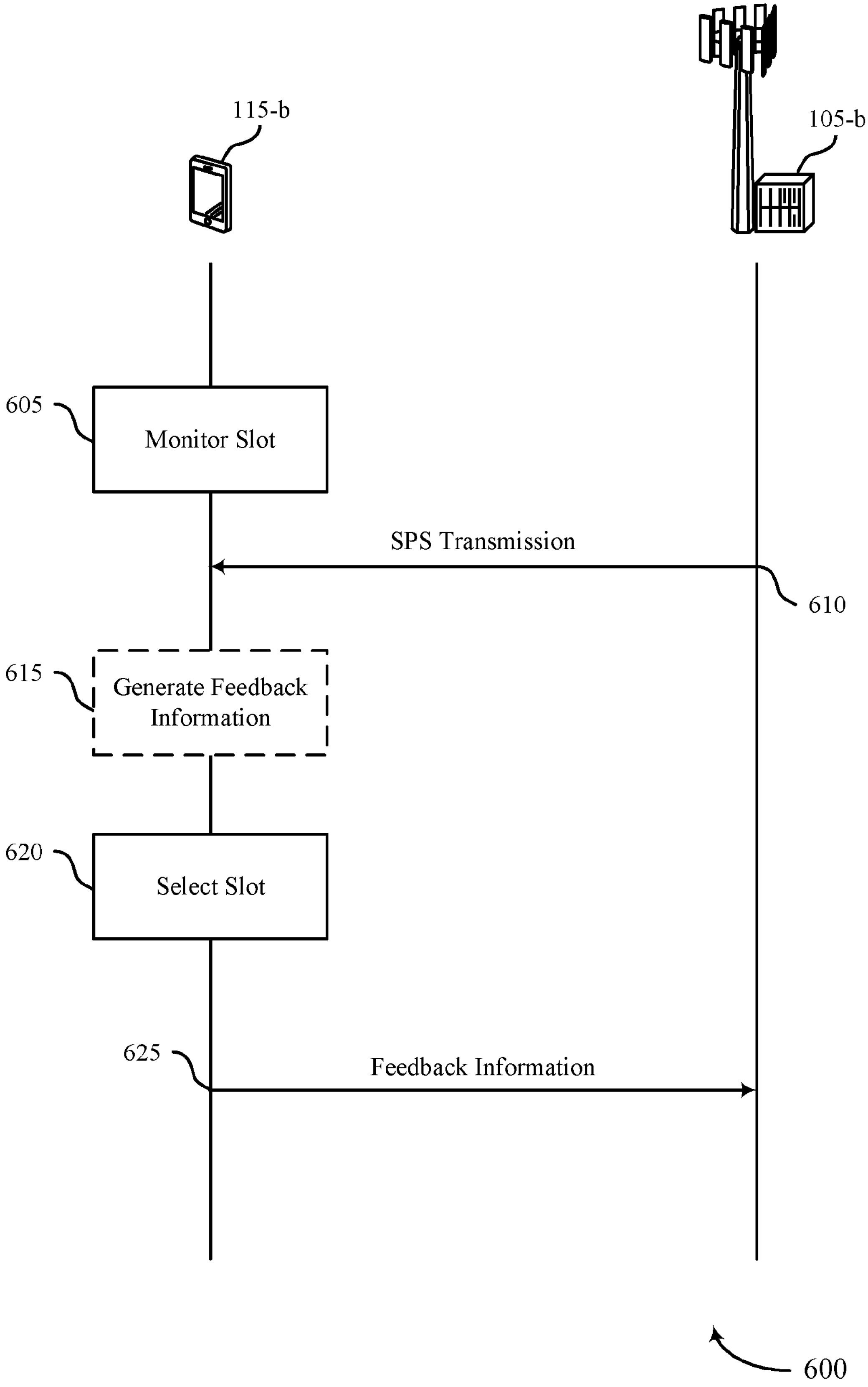
FIG. 6 illustrates an example of a process flow that supports SPS feedback deferral with carrier switching in uplink carrier aggregation in accordance with aspects of the present disclosure.

FIG. 6 illustrates an example of a process flow 600 that supports SPS feedback deferral with carrier switching in uplink carrier aggregation in accordance with aspects of the present disclosure. The process flow 600 may implement or be implemented by aspects of the wireless communications system 100 and 200 or the communications schemes 300, 400, and 500. For example, the process flow 600 may include a UE 115-*b* and a base station 105-*b*, which may be examples of corresponding devices described with reference to FIGS. 1-5. In the following description of the process flow 600, operations between the UE 115-*b* and the base station 105-*b* may be performed in a different order or at a different time than as shown. Additionally or alternatively, some operations may be omitted from the process flow 600, and other operations may be added to the process flow 600.

At 605, the UE 115-*b* may monitor a first slot for an SPS transmission on a first serving cell (e.g., component carrier) of multiple serving cells in a PUCCH group. The UE 115-*b* may monitor the first slot based on a reference numerology associated with the first serving cell. Each of the multiple serving cells may be associated with a reference numerology. In some examples, the multiple serving cells may be associated with different reference numerologies. In other examples, the multiple serving cells may be associated with the same reference numerology. In some examples, the multiple serving cells may include a primary cell and one or more secondary cells. For example, the first serving cell may be the primary cell and remaining serving cells of the multiple serving cells may be secondary cells.

At 610, the base station 105-*b* may transmit the SPS transmission to the UE 115-*b* in the first slot on the first serving cell. In some examples, the base station 105-*b* may configure the UE 115-*b* to transmit feedback information for the SPS transmission in a target slot. The UE 115-*b* may identify the target slot based on the first slot and a timing offset (e.g., a delay parameter). The timing offset may indicate a number of slots between the first slot and the target slot. In some examples, the base station 105-*b* may indicate the timing offset to the UE 115-*b* via RRC signaling. In other examples, the base station 105-*b* may indicate the timing offset to the UE 115-*b* via dynamic signaling (e.g., via DCI, MAC-CEs).

In some examples, the UE 115-*b* may generate the feedback information for the SPS transmission at 615. The UE 115-*b* may generate the feedback information based on monitoring the first slot. For example, if the UE 115-*b* successfully receives and decodes the SPS transmission, the UE 115-*b* may generate ACK feedback for the SPS transmission. Alternatively, if the UE 115-*b* is unable to receive and decode the SPS transmission, the UE 115-*b* may generate NACK feedback for the SPS transmission.

At 620, the UE 115-*b* may select either the target slot or a subsequent second slot (e.g., subsequent to the target slot) for transmission of the feedback information based on an availability of uplink resources on the multiple serving cells in the target slot. Additionally or alternatively, the UE 115-*b* may select a target serving cell of the multiple serving cells based on a time pattern associated with a first reference numerology. In some examples, the UE 115-*b* may select either the target slot or the subsequent second slot based on an availability of uplink resources on the target serving cell in the target slot. If, for example, the UE 115-*b* identifies a scheduling conflict associated with the target serving cell and the target slot (e.g., if there are insufficient available uplink resources for the UE 115-*b* to transmit the feedback information on the target serving cell in the target slot), the UE 115-*b* may scan the remaining serving cells according to a predefined ordering and may select the target slot or the subsequent second slot based on scanning the remaining serving cells.

As an example, if the UE 115-*b* selects a target serving cell and determines that there are insufficient available uplink resources for the UE 115-*b* to transmit the feedback information on the target serving cell in the target slot, the UE 115-*b* may defer transmission of the feedback information to a second serving cell (e.g., of the multiple serving cells) that has sufficient available uplink resources in the target slot. That is, the UE 115-*b* may select the second serving cell and the target slot for transmission of the feedback information. If the second serving cell (and the remaining serving cells) have insufficient available uplink resources for the UE 115-*b* to transmit the feedback information in the target slot, the UE 115-*b* may defer transmission of the feedback information to the subsequent second slot. In some examples, if there are insufficient available uplink resources for the UE 115-*b* to transmit the feedback information in the subsequent second slot, the UE 115-*b* may continue deferring transmission of the feedback information until the UE 115-*d* identifies a slot and a serving cell with sufficient available uplink resources for transmission of the feedback information.

At 625, the UE 115-*b* may transmit the feedback information to the base station 105-*b* in the target slot or the subsequent second slot. If, for example, the UE 115-*b* determines that there are sufficient available uplink resources for the UE 115-*b* to transmit the feedback information in the target slot on the target serving cell, the UE 115-*b* may transmit the feedback information accordingly. Alternatively, if the UE 115-*b* defers transmission of the feedback information to the second serving cell, the UE 115-*b* may transmit the feedback information in the target slot on the second serving cell. If the second serving cell (and the remaining serving cells) have insufficient available uplink resources for the UE 115-*b* to transmit the feedback information in the target slot, the UE 115-*b* may transmit the feedback information in the subsequent second slot (e.g., on one of the multiple serving cells).

Aspects of the process flow 600 may enable the UE 115-*b* to transmit the feedback information to the base station 105-*b* with reduced latency, among other benefits. For example, the described techniques may enable the UE 115-*b* to transmit the feedback information in the target slot on the second serving cell, as opposed to delaying transmission of the feedback information to the subsequent second slot.

Figure 7:
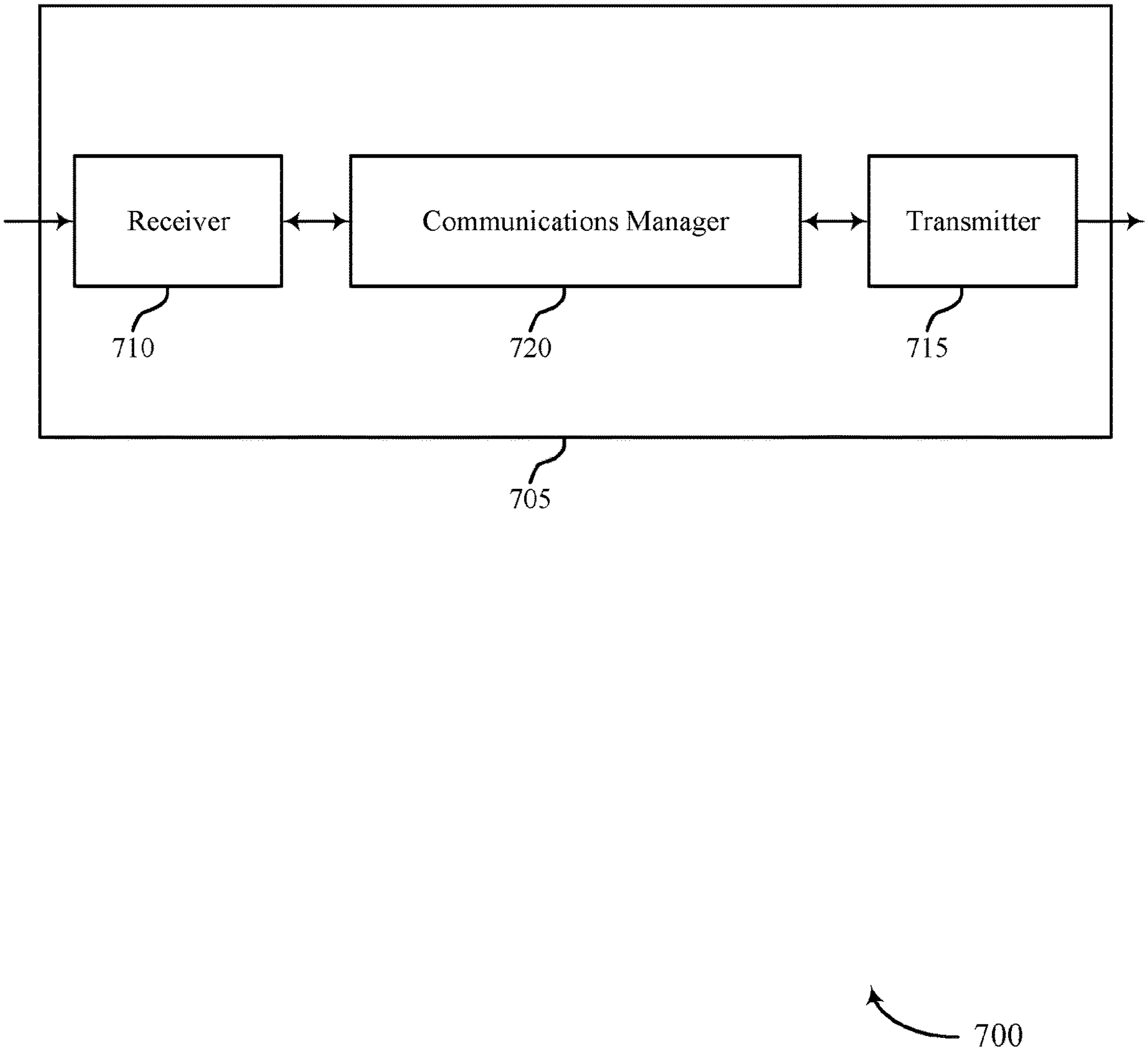
FIGS. 7 and 8 show block diagrams of devices that support SPS feedback deferral with carrier switching in uplink carrier aggregation in accordance with aspects of the present disclosure.

FIG. 7 shows a block diagram 700 of a device 705 that supports SPS feedback deferral with carrier switching in uplink carrier aggregation in accordance with aspects of the present disclosure. The device 705 may be an example of aspects of a UE 115 as described herein. The device 705 may include a receiver 710, a transmitter 715, and a communications manager 720. The device 705 may also include one or more processors, memory coupled with the one or more processors, and instructions stored in the memory that are executable by the one or more processors to enable the one or more processors to perform the resource management features discussed herein. Each of these components may be in communication with one another (e.g., via one or more buses).

The receiver 710 may provide a means for receiving information including at least one of packets, user data, control information, or a combination thereof associated with various information channels (e.g., control channels, data channels, information channels related to SPS feedback deferral with carrier switching in uplink carrier aggregation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information including at least one of packets, user data, control information, or a combination thereof associated with various information channels (e.g., control channels, data channels, information channels related to SPS feedback deferral with carrier switching in uplink carrier aggregation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of SPS feedback deferral with carrier switching in uplink carrier aggregation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), an application-specific integrated circuit (ASIC), a field-programmable gate array (FPGA) or other programmable logic device, a discrete gate or transistor logic, discrete hardware components, or a combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at the device 705 in accordance with examples as disclosed herein. For example, the communications manager 720 may be configured as or otherwise support a means for monitoring a first slot for an SPS transmission on a first serving cell of multiple serving cells in a PUCCH group, where the SPS transmission is associated with a target slot for feedback information. The communications manager 720 may be configured as or otherwise support a means for selecting between the target slot and a subsequent second slot to transmit the feedback information for the SPS transmission, where the selecting is in accordance with an availability of uplink resources on the multiple serving cells during the target slot. The communications manager 720 may be configured as or otherwise support a means for transmitting, to a base station, the feedback information for the SPS transmission on the target slot or the subsequent second slot according to the selection.

By including or configuring the communications manager 720 in accordance with examples as described herein, the device 705 (e.g., a processor controlling or otherwise coupled to at least one of the receiver 710, the transmitter 715, the communications manager 720, or a combination thereof) may support techniques for more efficient utilization of communication resources based on using PUCCH carrier switching and SPS feedback deferral to transmit feedback information for an SPS transmission.

Figure 8:
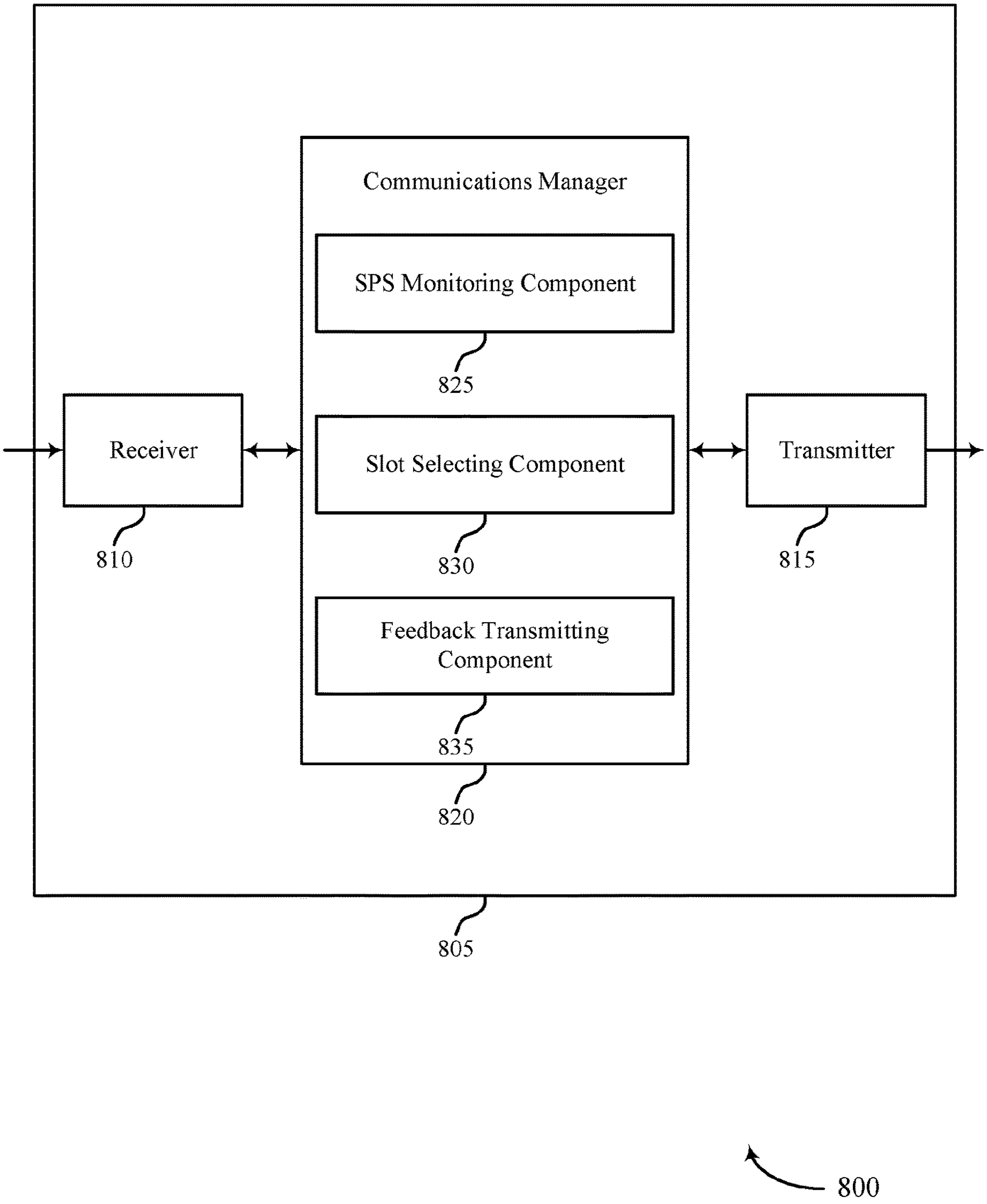

FIG. 8 shows a block diagram 800 of a device 805 that supports SPS feedback deferral with carrier switching in uplink carrier aggregation in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information including at least one of packets, user data, control information, or a combination thereof associated with various information channels (e.g., control channels, data channels, information channels related to SPS feedback deferral with carrier switching in uplink carrier aggregation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information including packets, user data, control information, or a combination thereof associated with various information channels (e.g., control channels, data channels, information channels related to SPS feedback deferral with carrier switching in uplink carrier aggregation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of SPS feedback deferral with carrier switching in uplink carrier aggregation as described herein. For example, the communications manager 820 may include at least one of an SPS monitoring component 825, a slot selecting component 830, a feedback transmitting component 835, or a combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at the device 805 in accordance with examples as disclosed herein. The SPS monitoring component 825 may be configured as or otherwise support a means for monitoring a first slot for an SPS transmission on a first serving cell of multiple serving cells in a PUCCH group, where the SPS transmission is associated with a target slot for feedback information. The slot selecting component 830 may be configured as or otherwise support a means for selecting between the target slot and a subsequent second slot to transmit the feedback information for the SPS transmission, where the selecting is in accordance with an availability of uplink resources on the multiple serving cells during the target slot. The feedback transmitting component 835 may be configured as or otherwise support a means for transmitting, to a base station, the feedback information for the SPS transmission on the target slot or the subsequent second slot according to the selection.

In some cases, the SPS monitoring component 825, the slot selecting component 830, and the feedback transmitting component 835 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the SPS monitoring component 825, the slot selecting component 830, and the feedback transmitting component 835 discussed herein. A transceiver processor may be collocated with and/or communicate with (e.g., direct the operations of) a transceiver of the device 805. A radio processor may be collocated with and/or communicate with (e.g., direct the operations of) a radio (e.g., an NR radio, an LTE radio, a Wi-Fi radio) of the device 805. A transmitter processor may be collocated with and/or communicate with (e.g., direct the operations of) a transmitter of the device 805. A receiver processor may be collocated with and/or communicate with (e.g., direct the operations of) a receiver of the device 805.

Figure 9:
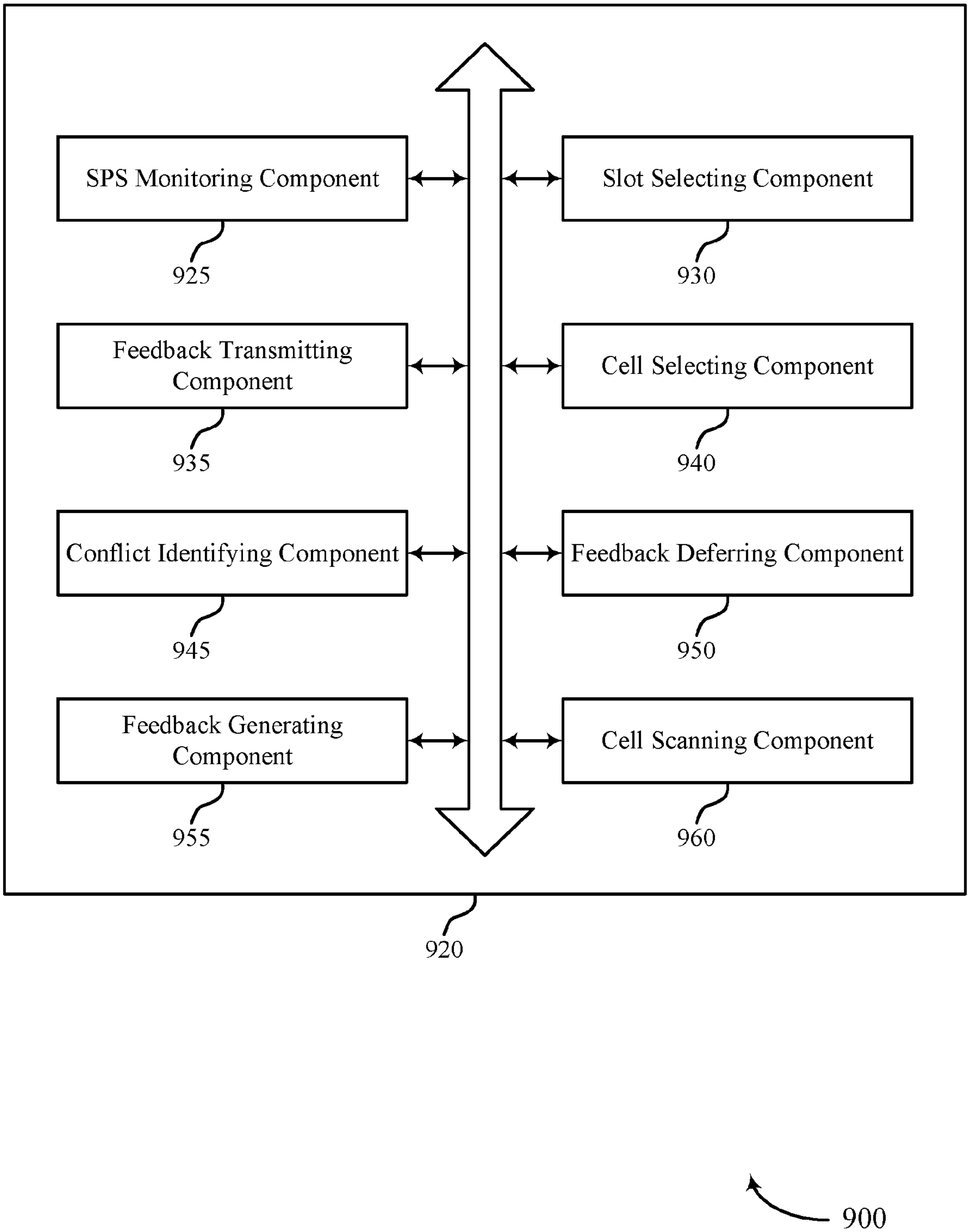
FIG. 9 shows a block diagram of a communications manager that supports SPS feedback deferral with carrier switching in uplink carrier aggregation in accordance with aspects of the present disclosure.

FIG. 9 shows a block diagram 900 of a communications manager 920 that supports SPS feedback deferral with carrier switching in uplink carrier aggregation in accordance with aspects of the present disclosure. The communications manager 920 may be an example of aspects of a communications manager 720, a communications manager 820, or both, as described herein. The communications manager 920, or various components thereof, may be an example of means for performing various aspects of SPS feedback deferral with carrier switching in uplink carrier aggregation as described herein. For example, the communications manager 920 may include at least one of an SPS monitoring component 925, a slot selecting component 930, a feedback transmitting component 935, a cell selecting component 940, a conflict identifying component 945, a feedback deferring component 950, a feedback generating component 955, a cell scanning component 960, or a combination thereof. Each of these components may communicate, directly or indirectly, with one another (e.g., via one or more buses).

The communications manager 920 may support wireless communication at the device 905 in accordance with examples as disclosed herein. The SPS monitoring component 925 may be configured as or otherwise support a means for monitoring a first slot for an SPS transmission on a first serving cell of multiple serving cells in a PUCCH group, where the SPS transmission is associated with a target slot for feedback information.

The slot selecting component 930 may be configured as or otherwise support a means for selecting between the target slot and a subsequent second slot to transmit the feedback information for the SPS transmission, where the selecting is in accordance with an availability of uplink resources on the multiple serving cells during the target slot.

The feedback transmitting component 935 may be configured as or otherwise support a means for transmitting, to a base station, the feedback information for the SPS transmission on the target slot or the subsequent second slot according to the selection.

In some examples, the cell selecting component 940 may be configured as or otherwise support a means for selecting a target serving cell of the multiple serving cells based on a time pattern according to a first reference numerology, where selecting between the target slot and the subsequent second slot to transmit the feedback information for the SPS transmission is in accordance with the availability of uplink resources on the target serving cell.

In some examples, the conflict identifying component 945 may be configured as or otherwise support a means for identifying, for the target serving cell during the target slot, a scheduling conflict between uplink transmission of the feedback information and a downlink reception.

In some examples, the cell scanning component 960 may be configured as or otherwise support a means for scanning, according to a predefined ordering, remaining serving cells of the multiple serving cells for the availability of uplink resources to transmit the feedback information, where selecting between the target slot and the subsequent second slot to transmit the feedback information for the SPS transmission is in accordance with the availability of uplink resources on at least one serving cell of the remaining serving cells during the target slot.

In some examples, the cell selecting component 940 may be configured as or otherwise support a means for selecting a target serving cell of the multiple serving cells based on a time pattern according to a first reference numerology.

In some examples, the conflict identifying component 945 may be configured as or otherwise support a means for identifying, for the target slot, a scheduling conflict between uplink transmission of the feedback information and a downlink reception.

In some examples, the feedback deferring component 950 may be configured as or otherwise support a means for deferring transmission of the feedback information to the subsequent second slot based on identifying the scheduling conflict, where selecting the subsequent second slot is in accordance with the availability of uplink resources on the multiple serving cells.

In some examples, the cell selecting component 940 may be configured as or otherwise support a means for identifying a subset of serving cells of the multiple serving cells that are configured for deferred transmission on the subsequent second slot. In some examples, the subset of serving cells configured for deferred transmission on the subsequent second slot includes the multiple serving cells.

In some examples, the cell selecting component 940 may be configured as or otherwise support a means for selecting a second target serving cell of the subset of serving cells for transmission of the feedback information on the subsequent second slot based at least in part on the time pattern.

In some examples, the feedback transmitting component 935 may be configured as or otherwise support a means for transmitting, to the base station, the feedback information on the second target serving cell and on the subsequent second slot in accordance with an availability of uplink resources on the second target serving cell during the subsequent second slot.

In some examples, the conflict identifying component 945 may be configured as or otherwise support a means for identifying, for the second target serving cell during the subsequent second slot, a second scheduling conflict between uplink transmission of the feedback information and a downlink reception.

In some examples, the cell scanning component 960 may be configured as or otherwise support a means for scanning, according to a predefined ordering, remaining serving cells of the subset of serving cells based on identifying the second scheduling conflict.

In some examples, the feedback transmitting component 935 may be configured as or otherwise support a means for transmitting the feedback information to the base station on one of the remaining serving cells during the subsequent second slot or deferring transmission of the feedback information to a subsequent third slot in accordance with an availability of uplink resources on the remaining serving cells during the subsequent second slot.

In some examples, the feedback deferring component 950 may be configured as or otherwise support a means for identifying a maximum deferral value for each serving cell of the multiple serving cells, where deferring transmission of the feedback information is based on identifying the maximum deferral value.

In some examples, the slot selecting component 930 may be configured as or otherwise support a means for identifying the target slot based on a delay parameter according to a second reference numerology, where deferring transmission of the feedback information is based on identifying the target slot. The delay parameter may be an offset between the first slot (e.g., in which the device 905 receives the SPS transmission) and the target slot (e.g., in which the device 905 is scheduled to transmit the feedback information for the SPS transmission). In some examples, the base station may transmit an indication of the delay parameter to the device 905 (e.g., via control signaling).

In some examples, the first reference numerology uses the first serving cell as a reference and the second reference numerology uses a second serving cell as a reference. In some examples, the first reference numerology and the second reference numerology use a second serving cell as a reference. In some examples, the first reference numerology includes a numerology of a primary cell of the multiple serving cells in the PUCCH group, and the second reference numerology includes a numerology of a serving cell having a largest numerology among the multiple serving cells in the PUCCH group. In some examples, the first serving cell is a primary cell and remaining serving cells of the multiple serving cells are secondary cells. In some examples, the second serving cell includes at least one of one of a serving cell with a largest numerology among the multiple serving cells in the PUCCH group, a serving cell with a smallest numerology among the multiple serving cells in the PUCCH group, the primary cell of the multiple serving cells in the PUCCH group, or a combination thereof.

In some examples, the feedback generating component 955 may be configured as or otherwise support a means for generating the feedback information for the SPS transmission based on the monitoring, where selecting between the target slot and the subsequent second slot is based on generating the feedback information.

In some cases, the SPS monitoring component 925, the slot selecting component 930, the feedback transmitting component 935, the cell selecting component 940, the conflict identifying component 945, the feedback deferring component 950, the feedback generating component 955, and the cell scanning component 960 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the SPS monitoring component 925, the slot selecting component 930, the feedback transmitting component 935, the cell selecting component 940, the conflict identifying component 945, the feedback deferring component 950, the feedback generating component 955, and the cell scanning component 960 discussed herein.

Figure 10:
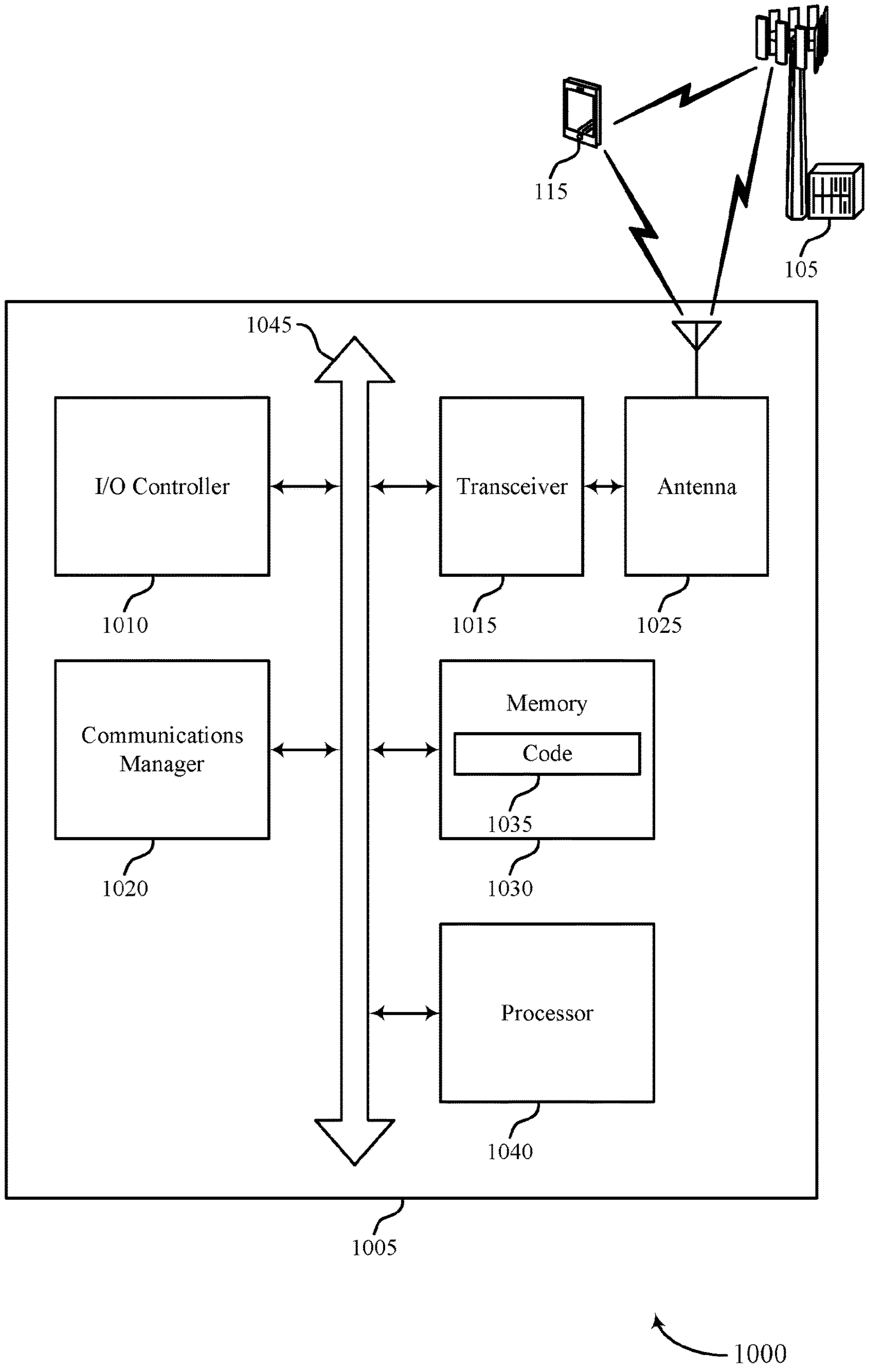
FIG. 10 shows a diagram of a system including a device that supports SPS feedback deferral with carrier switching in uplink carrier aggregation in accordance with aspects of the present disclosure.

FIG. 10 shows a diagram of a system 1000 including a device 1005 that supports SPS feedback deferral with carrier switching in uplink carrier aggregation in accordance with aspects of the present disclosure. The device 1005 may be an example of or include the components of a device 705, a device 805, or a UE 115 as described herein. The device 1005 may communicate wirelessly with at least one or more base stations 105, UEs 115, or a combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of at least one of a transmitter 715, a transmitter 815, a receiver 710, a receiver 810, or a combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., at least one of a general-purpose processor, a DSP, a CPU, a microcontroller, an ASIC, an FPGA, a programmable logic device, a discrete gate or transistor logic component, a discrete hardware component, or a combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting SPS feedback deferral with carrier switching in uplink carrier aggregation). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at the device 1005 in accordance with examples as disclosed herein. For example, the communications manager 1020 may be configured as or otherwise support a means for monitoring a first slot for an SPS transmission on a first serving cell of multiple serving cells in a PUCCH group, where the SPS transmission is associated with a target slot for feedback information. The communications manager 1020 may be configured as or otherwise support a means for selecting between the target slot and a subsequent second slot to transmit the feedback information for the SPS transmission, where the selecting is in accordance with an availability of uplink resources on the multiple serving cells during the target slot. The communications manager 1020 may be configured as or otherwise support a means for transmitting, to a base station, the feedback information for the SPS transmission on the target slot or the subsequent second slot according to the selection.

By including or configuring the communications manager 1020 in accordance with examples as described herein, the device 1005 may support techniques for reduced latency based on attempting to defer transmission of feedback information (e.g., SPS ACK or NACK feedback) to a different target serving cell prior to deferring transmission of the feedback information to a subsequent second slot.

In some examples, the communications manager 1020 may be configured to perform various operations (e.g., receiving, monitoring, transmitting) using or otherwise in cooperation with at least one of the transceiver 1015, the one or more antennas 1025, or a combination thereof. Although the communications manager 1020 is illustrated as a separate component, in some examples, one or more functions described with reference to the communications manager 1020 may be supported by or performed by at least one of the processor 1040, the memory 1030, the code 1035, or a combination thereof. For example, the code 1035 may include instructions executable by the processor 1040 to cause the device 1005 to perform various aspects of SPS feedback deferral with carrier switching in uplink carrier aggregation as described herein, or the processor 1040 and the memory 1030 may be otherwise configured to perform or support such operations.

Figure 11:
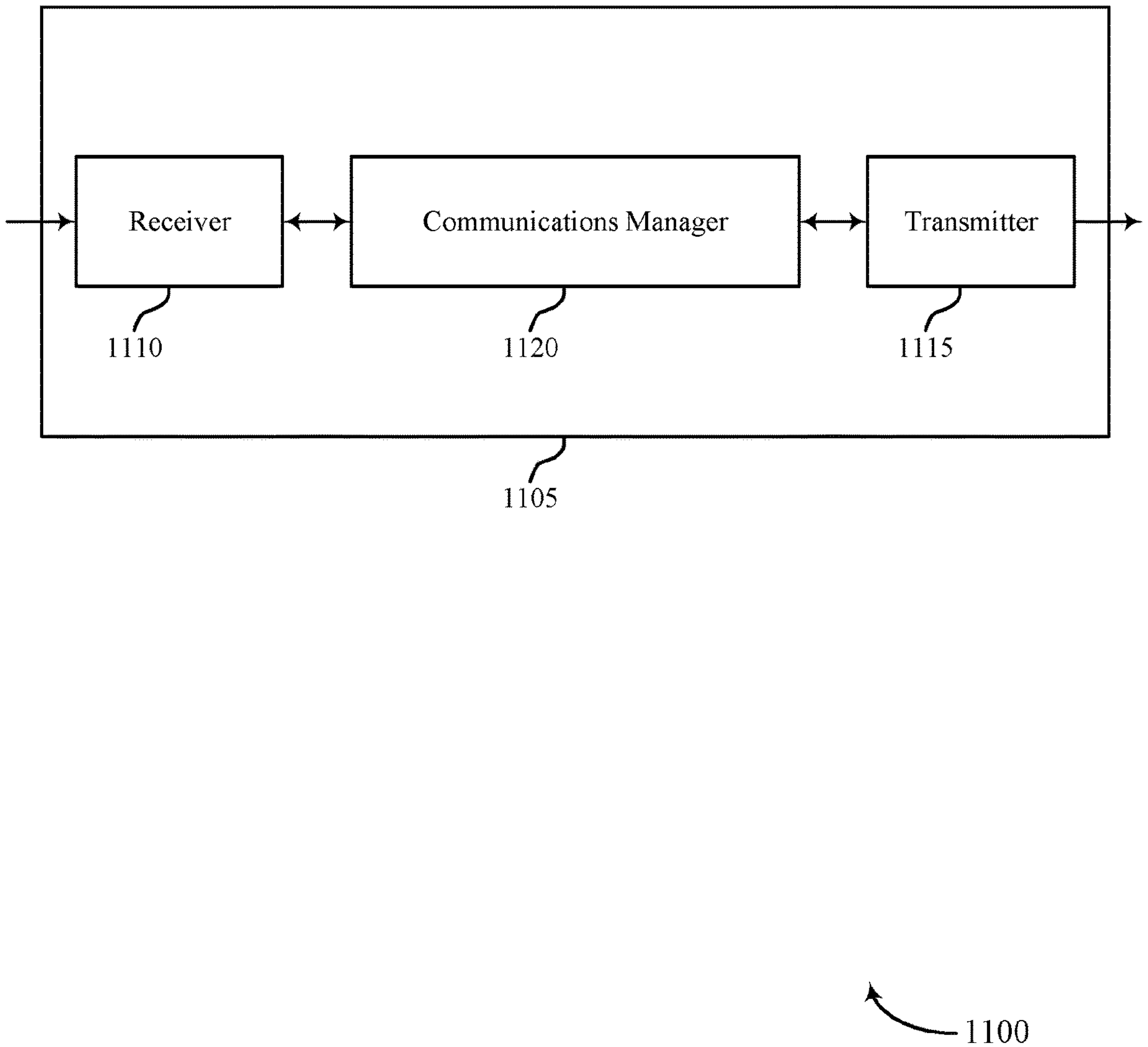
FIGS. 11 and 12 show block diagrams of devices that support SPS feedback deferral with carrier switching in uplink carrier aggregation in accordance with aspects of the present disclosure.

FIG. 11 shows a block diagram 1100 of a device 1105 that supports SPS feedback deferral with carrier switching in uplink carrier aggregation in accordance with aspects of the present disclosure. The device 1105 may be an example of aspects of a base station 105 as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the resource management features discussed herein. Each of these components may be in communication with one another (e.g., via one or more buses).

The receiver 1110 may provide a means for receiving information including at least one of packets, user data, control information, or a combination thereof associated with various information channels (e.g., control channels, data channels, information channels related to SPS feedback deferral with carrier switching in uplink carrier aggregation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information including at least one of packets, user data, control information, or a combination thereof associated with various information channels (e.g., control channels, data channels, information channels related to SPS feedback deferral with carrier switching in uplink carrier aggregation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of SPS feedback deferral with carrier switching in uplink carrier aggregation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, an ASIC, an FPGA or other programmable logic device, a discrete gate or transistor logic, discrete hardware components, or a combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at the device 1105 in accordance with examples as disclosed herein. For example, the communications manager 1120 may be configured as or otherwise support a means for transmitting, to a UE, an SPS transmission on a first slot and a first serving cell of multiple serving cells in a PUCCH group, where the SPS transmission is associated with a target slot for feedback information. The communications manager 1120 may be configured as or otherwise support a means for receiving, from the UE, the feedback information for the SPS transmission on a target slot or a subsequent second slot, where either the target slot or the subsequent second slot is selected in accordance with an availability of uplink resources on the multiple serving cells during the target slot.

By including or configuring the communications manager 1120 in accordance with examples as described herein, the device 1105 (e.g., a processor controlling or otherwise coupled to at least one of the receiver 1110, the transmitter 1115, the communications manager 1120, or a combination thereof) may support techniques for more efficient utilization of communication resources based on configuring a UE 115 to use PUCCH carrier switching and SPS feedback deferral for transmission of SPS feedback information.

Figure 12:
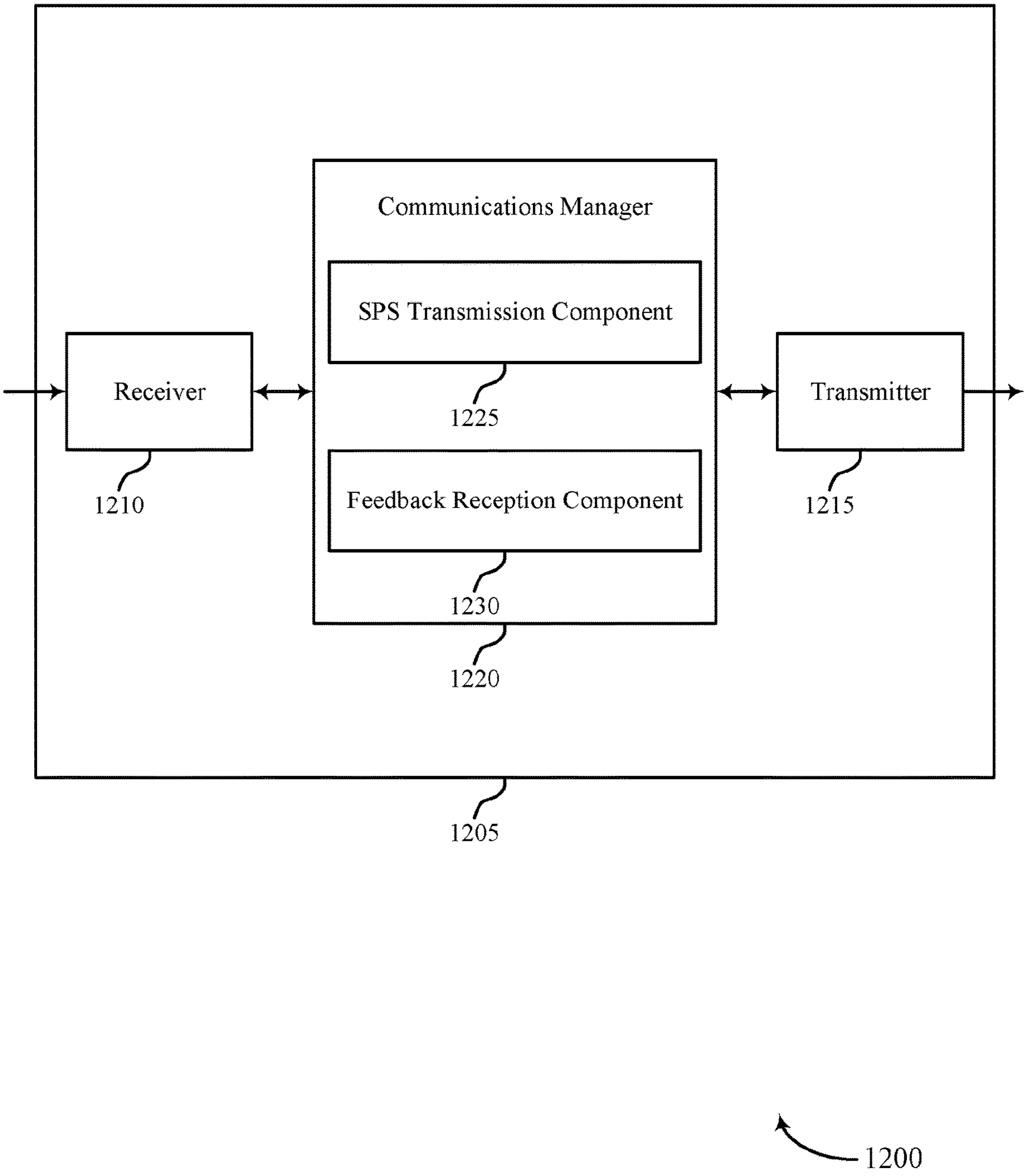

FIG. 12 shows a block diagram 1200 of a device 1205 that supports SPS feedback deferral with carrier switching in uplink carrier aggregation in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information including at least one of packets, user data, control information, or a combination thereof associated with various information channels (e.g., control channels, data channels, information channels related to SPS feedback deferral with carrier switching in uplink carrier aggregation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information including at least one of packets, user data, control information, or a combination thereof associated with various information channels (e.g., control channels, data channels, information channels related to SPS feedback deferral with carrier switching in uplink carrier aggregation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of SPS feedback deferral with carrier switching in uplink carrier aggregation as described herein. For example, the communications manager 1220 may include at least one of an SPS transmission component 1225 a feedback reception component 1230, or a combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at the device 1205 in accordance with examples as disclosed herein. The SPS transmission component 1225 may be configured as or otherwise support a means for transmitting, to a UE, an SPS transmission on a first slot and a first serving cell of multiple serving cells in a PUCCH group, where the SPS transmission is associated with a target slot for feedback information. The feedback reception component 1230 may be configured as or otherwise support a means for receiving, from the UE, the feedback information for the SPS transmission on a target slot or a subsequent second slot, where either the target slot or the subsequent second slot is selected in accordance with an availability of uplink resources on the multiple serving cells during the target slot.

In some cases, the SPS transmission component 1225 and the feedback reception component 1230 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the SPS transmission component 1225 and the feedback reception component 1230 discussed herein. A transceiver processor may be collocated with and/or communicate with (e.g., direct the operations of) a transceiver of the device 1205. A radio processor may be collocated with and/or communicate with (e.g., direct the operations of) a radio (e.g., an NR radio, an LTE radio, a Wi-Fi radio) of the device 1205. A transmitter processor may be collocated with and/or communicate with (e.g., direct the operations of) a transmitter of the device 1205. A receiver processor may be collocated with and/or communicate with (e.g., direct the operations of) a receiver of the device 1205.

Figure 13:
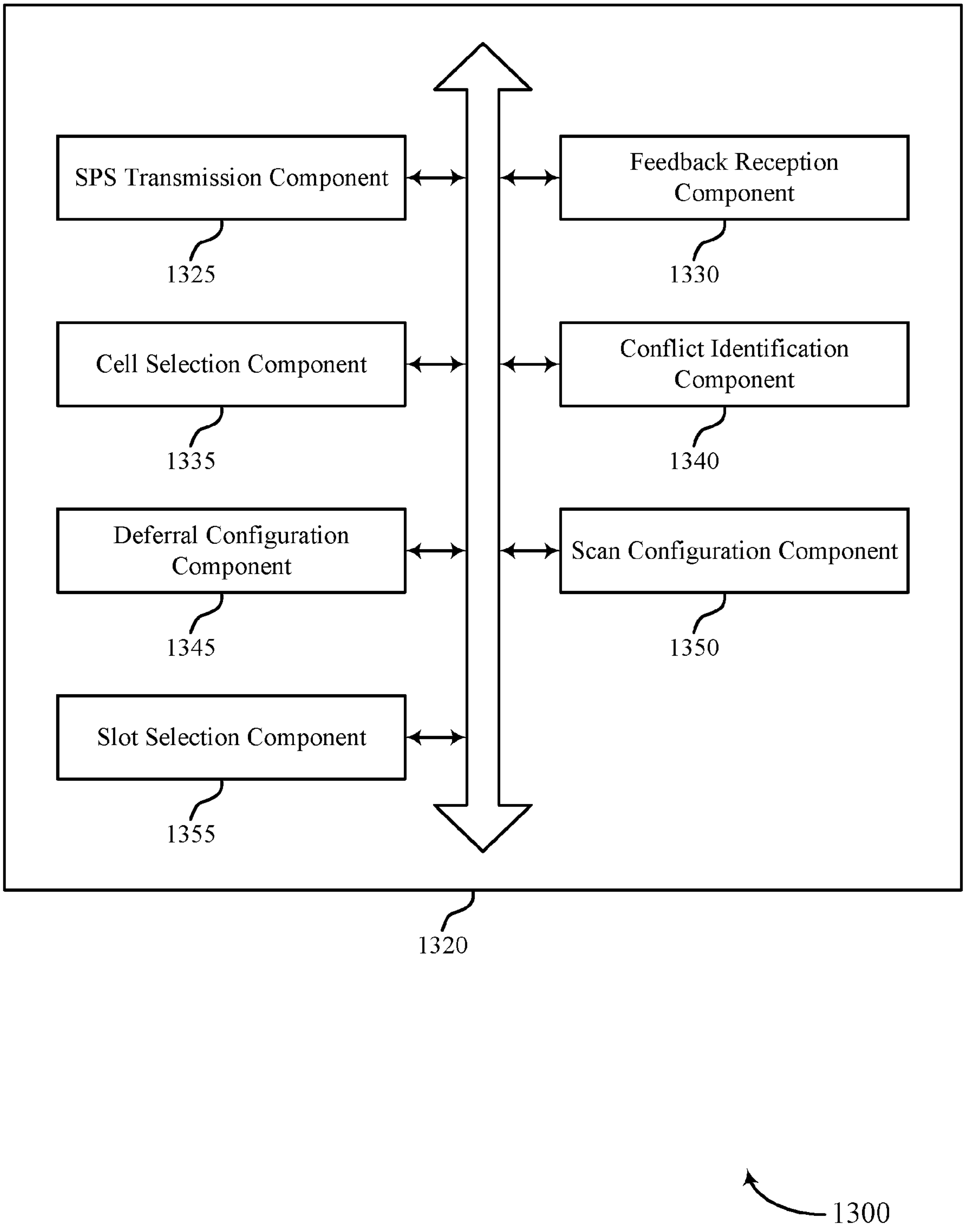
FIG. 13 shows a block diagram of a communications manager that supports SPS feedback deferral with carrier switching in uplink carrier aggregation in accordance with aspects of the present disclosure.

FIG. 13 shows a block diagram 1300 of a communications manager 1320 that supports SPS feedback deferral with carrier switching in uplink carrier aggregation in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of SPS feedback deferral with carrier switching in uplink carrier aggregation as described herein. For example, the communications manager 1320 may include at least one of an SPS transmission component 1325, a feedback reception component 1330, a cell selection component 1335, a conflict identification component 1340, a deferral configuration component 1345, a scan configuration component 1350, a slot selection component 1355, or a combination thereof. Each of these components may communicate, directly or indirectly, with one another (e.g., via one or more buses).

The communications manager 1320 may support wireless communication at the device 1305 in accordance with examples as disclosed herein. The SPS transmission component 1325 may be configured as or otherwise support a means for transmitting, to a UE, an SPS transmission on a first slot and a first serving cell of multiple serving cells in a PUCCH group, where the SPS transmission is associated with a target slot for feedback information. The feedback reception component 1330 may be configured as or otherwise support a means for receiving, from the UE, the feedback information for the SPS transmission on a target slot or a subsequent second slot, where either the target slot or the subsequent second slot is selected in accordance with an availability of uplink resources on the multiple serving cells during the target slot.

In some examples, the cell selection component 1335 may be configured as or otherwise support a means for configuring the UE to select a target serving cell of the multiple serving cells based on a time pattern according to a first reference numerology, where the target slot is selected in accordance with the availability of uplink resources on the target serving cell.

In some examples, the conflict identification component 1340 may be configured as or otherwise support a means for identifying, for the target serving cell during the target slot, a scheduling conflict between uplink transmission of the feedback information and a downlink reception. In some examples, the scan configuration component 1350 may be configured as or otherwise support a means for configuring the UE to scan, according to a predefined ordering, remaining serving cells of the multiple serving cells for the availability of uplink resources to transmit the feedback information, where the target slot is selected in accordance with the availability of uplink resources on at least one serving cell of the remaining serving cells during the target slot.

In some examples, the cell selection component 1335 may be configured as or otherwise support a means for configuring the UE to select a target serving cell of the multiple serving cells based on a time pattern according to a first reference numerology. In some examples, the conflict identification component 1340 may be configured as or otherwise support a means for identifying, for the target slot, a scheduling conflict between uplink transmission of the feedback information and a downlink reception. In some examples, the deferral configuration component 1345 may be configured as or otherwise support a means for configuring the UE to defer transmission of the feedback information to the subsequent second slot based on identifying the scheduling conflict, where the subsequent second slot is selected in accordance with the availability of uplink resources on the multiple serving cells.

In some examples, the slot selection component 1355 may be configured as or otherwise support a means for identifying the target slot based on a delay parameter according to a second reference numerology, where the transmission of the feedback information is deferred based on identifying the target slot. The delay parameter may be an offset between the first slot (e.g., in which the device 1305 transmits the SPS transmission) and the target slot (e.g., in which the device 1305 is scheduled to receive the feedback information for the SPS transmission). In some examples, the device 1305 may transmit an indication of the delay parameter to the UE (e.g., via control signaling).

In some examples, the first reference numerology uses the first serving cell as a reference and the second reference numerology uses a second serving cell as a reference. In some examples, the first reference numerology and the second reference numerology use a second serving cell as a reference. In some examples, the first reference numerology includes a numerology of a primary cell of the multiple serving cells in the PUCCH group, and the second reference numerology includes a numerology of a serving cell having a largest numerology among the multiple serving cells in the PUCCH group.

In some examples, the first serving cell is a primary cell and remaining serving cells of the multiple serving cells are secondary cells. In some examples, the second serving cell includes at least one of a serving cell with a largest numerology among the multiple serving cells in the PUCCH group, a serving cell with a smallest numerology among the multiple serving cells in the PUCCH group, the primary cell of the multiple serving cells in the PUCCH group, or a combination thereof.

In some cases, the SPS transmission component 1325, the feedback reception component 1330, the cell selection component 1335, the conflict identification component 1340, the deferral configuration component 1345, the scan configuration component 1350, and the slot selection component 1355 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the SPS transmission component 1325, the feedback reception component 1330, the cell selection component 1335, the conflict identification component 1340, the deferral configuration component 1345, the scan configuration component 1350, and the slot selection component 1355 discussed herein.

Figure 14:
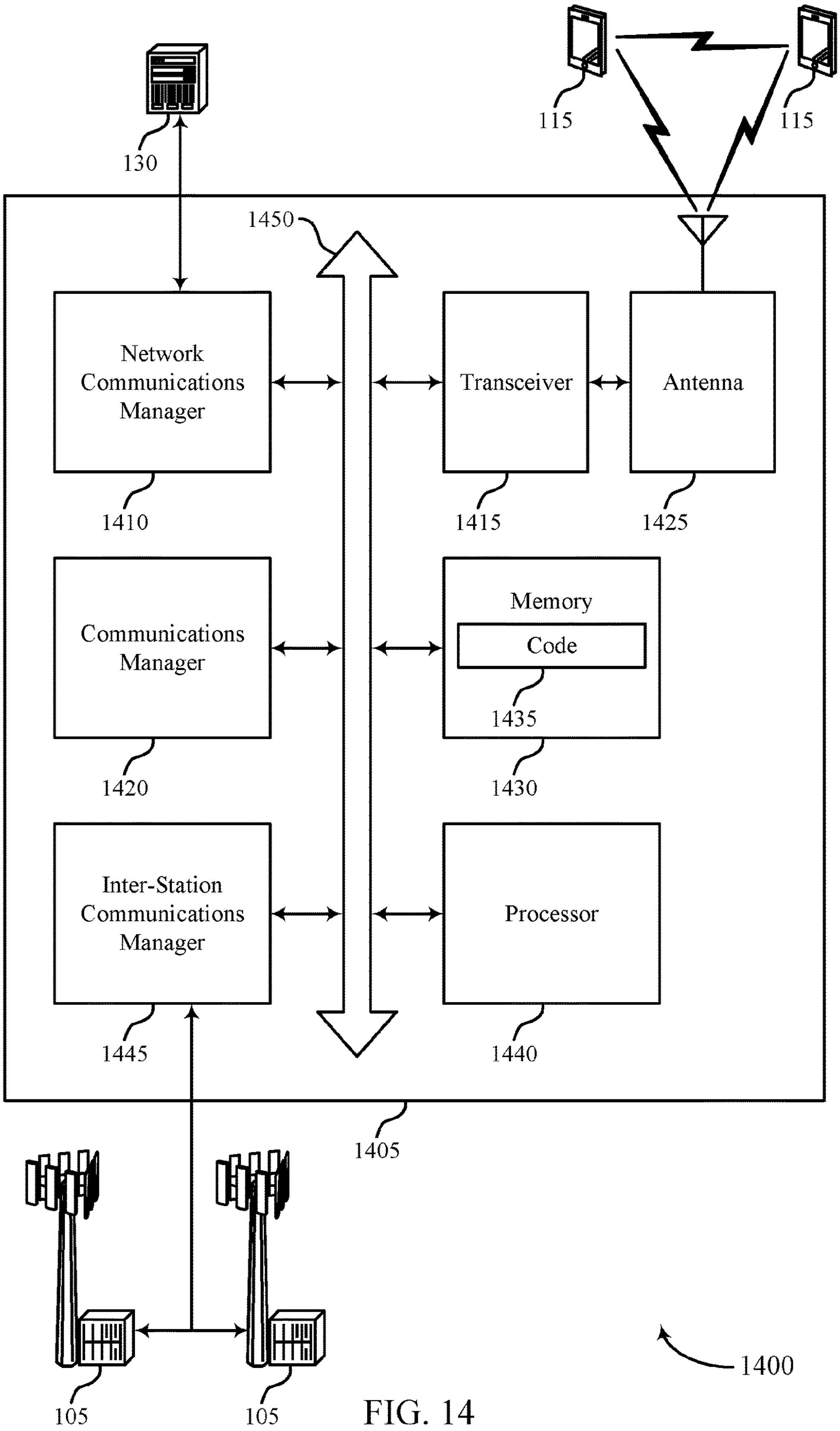
FIG. 14 shows a diagram of a system including a device that supports SPS feedback deferral with carrier switching in uplink carrier aggregation in accordance with aspects of the present disclosure.

FIG. 14 shows a diagram of a system 1400 including a device 1405 that supports SPS feedback deferral with carrier switching in uplink carrier aggregation in accordance with aspects of the present disclosure. The device 1405 may be an example of or include the components of a device 1105, a device 1205, or a base station 105 as described herein. The device 1405 may communicate wirelessly with at least one or more base stations 105, UEs 115, or a combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of at least one of a transmitter 1115, a transmitter 1215, a receiver 1110, a receiver 1210, or a combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., at least one of a general-purpose processor, a DSP, a CPU, a microcontroller, an ASIC, an FPGA, a programmable logic device, a discrete gate or transistor logic component, a discrete hardware component, or a combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting SPS feedback deferral with carrier switching in uplink carrier aggregation). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at the device 1405 in accordance with examples as disclosed herein. For example, the communications manager 1420 may be configured as or otherwise support a means for transmitting, to a UE, an SPS transmission on a first slot and a first serving cell of multiple serving cells in a PUCCH group, where the SPS transmission is associated with a target slot for feedback information. The communications manager 1420 may be configured as or otherwise support a means for receiving, from the UE, the feedback information for the SPS transmission on a target slot or a subsequent second slot, where either the target slot or the subsequent second slot is selected in accordance with an availability of uplink resources on the multiple serving cells during the target slot.

By including or configuring the communications manager 1420 in accordance with examples as described herein, the device 1405 may support techniques for reduced latency based on configuring a UE 115 to use PUCCH carrier switching and SPS feedback deferral for transmission of SPS feedback information. For example, if the UE 115 is unable to transmit the SPS feedback information in a target slot on a target CC, the device 1405 may configure the UE 115 to defer transmission of the SPS feedback information to another target serving cell (e.g., using PUCCH carrier switching) prior to deferring the SPS feedback information to a subsequent second slot (e.g., using SPS feedback deferral).

In some examples, the communications manager 1420 may be configured to perform various operations (e.g., receiving, monitoring, transmitting) using or otherwise in cooperation with at least one of the transceiver 1415, the one or more antennas 1425, or a combination thereof. Although the communications manager 1420 is illustrated as a separate component, in some examples, one or more functions described with reference to the communications manager 1420 may be supported by or performed by at least one of the processor 1440, the memory 1430, the code 1435, or a combination thereof. For example, the code 1435 may include instructions executable by the processor 1440 to cause the device 1405 to perform various aspects of SPS feedback deferral with carrier switching in uplink carrier aggregation as described herein, or the processor 1440 and the memory 1430 may be otherwise configured to perform or support such operations.

Figure 15:
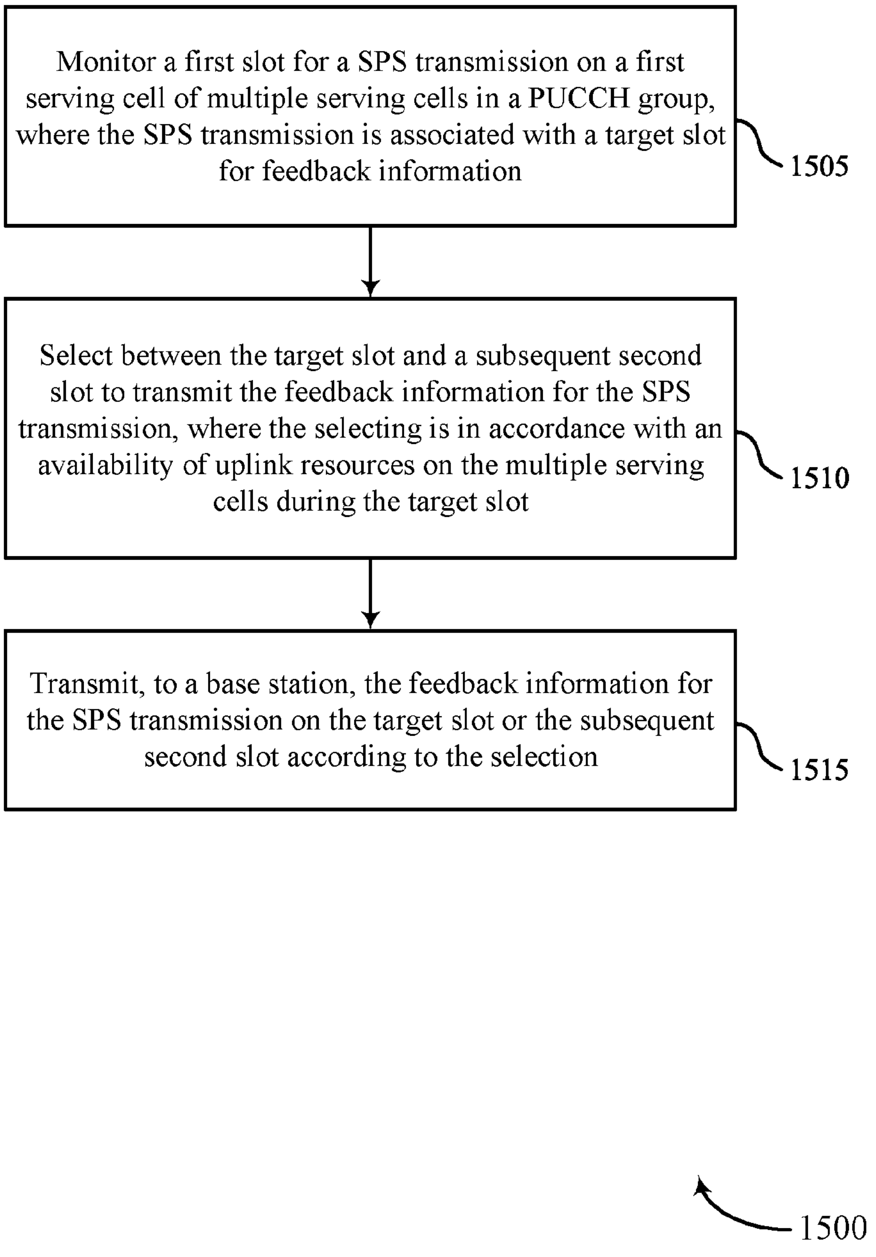
FIGS. 15 through 18 show flowcharts illustrating methods that support SPS feedback deferral with carrier switching in uplink carrier aggregation in accordance with aspects of the present disclosure.

FIG. 15 shows a flowchart illustrating a method 1500 that supports SPS feedback deferral with carrier switching in uplink carrier aggregation in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include monitoring a first slot for an SPS transmission on a first serving cell of multiple serving cells in a PUCCH group, where the SPS transmission is associated with a target slot for feedback information. The operations of 1505 may be performed in accordance with examples as disclosed herein. In some examples, aspects of the operations of 1505 may be performed by an SPS monitoring component 925 as described with reference to FIG. 9.

At 1510, the method may include selecting between the target slot and a subsequent second slot to transmit the feedback information for the SPS transmission, where the selecting is in accordance with an availability of uplink resources on the multiple serving cells during the target slot. The operations of 1510 may be performed in accordance with examples as disclosed herein. In some examples, aspects of the operations of 1510 may be performed by a slot selecting component 930 as described with reference to FIG. 9.

At 1515, the method may include transmitting, to a base station, the feedback information for the SPS transmission on the target slot or the subsequent second slot according to the selection. The operations of 1515 may be performed in accordance with examples as disclosed herein. In some examples, aspects of the operations of 1515 may be performed by a feedback transmitting component 935 as described with reference to FIG. 9.

Figure 16:
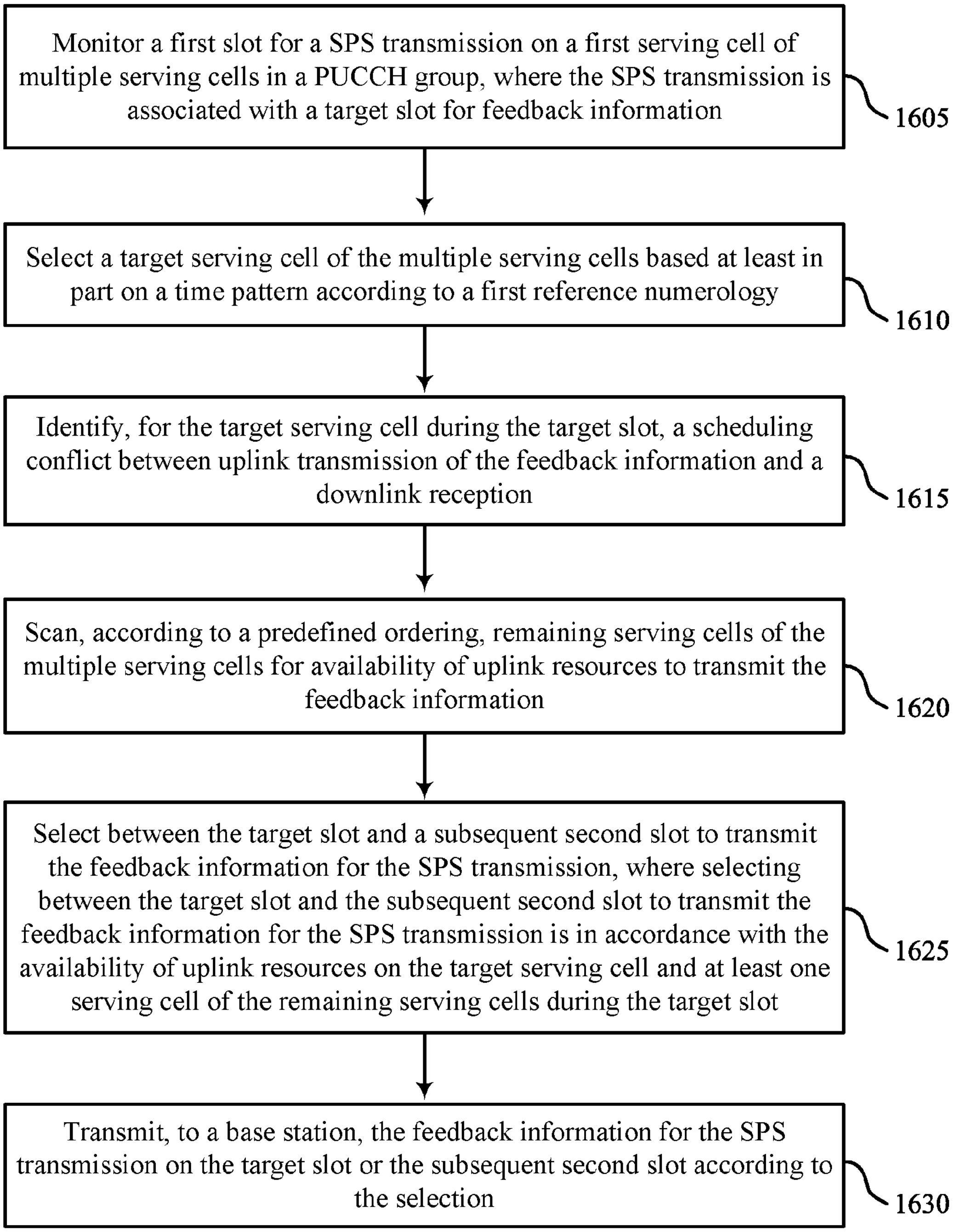

FIG. 16 shows a flowchart illustrating a method 1600 that supports SPS feedback deferral with carrier switching in uplink carrier aggregation in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include monitoring a first slot for an SPS transmission on a first serving cell of multiple serving cells in a PUCCH group, where the SPS transmission is associated with a target slot for feedback information. The operations of 1605 may be performed in accordance with examples as disclosed herein. In some examples, aspects of the operations of 1605 may be performed by an SPS monitoring component 925 as described with reference to FIG. 9.

At 1610, the method may include selecting a target serving cell of the multiple serving cells based on a time pattern according to a first reference numerology. The operations of 1610 may be performed in accordance with examples as disclosed herein. In some examples, aspects of the operations of 1610 may be performed by a cell selecting component 940 as described with reference to FIG. 9.

At 1615, the method may include identifying, for the target serving cell during the target slot, a scheduling conflict between uplink transmission of the feedback information and a downlink reception. The operations of 1615 may be performed in accordance with examples as disclosed herein. In some examples, aspects of the operations of 1615 may be performed by a conflict identifying component 945 as described with reference to FIG. 9.

At 1620, the method may include scanning, according to a predefined ordering, remaining serving cells of the multiple serving cells for the availability of uplink resources to transmit the feedback information. The operations of 1620 may be performed in accordance with examples as disclosed herein. In some examples, aspects of the operations of 1620 may be performed by a cell scanning component 960 as described with reference to FIG. 9.

At 1625, the method may include selecting between the target slot and a subsequent second slot to transmit the feedback information for the SPS transmission, where selecting between the target slot and the subsequent second slot to transmit the feedback information for the SPS transmission is in accordance with the availability of uplink resources on the target serving cell and at least one serving cell of the remaining serving cells during the target slot. The operations of 1625 may be performed in accordance with examples as disclosed herein. In some examples, aspects of the operations of 1625 may be performed by a slot selecting component 930 as described with reference to FIG. 9.

At 1630, the method may include transmitting, to a base station, the feedback information for the SPS transmission on the target slot or the subsequent second slot according to the selection. The operations of 1630 may be performed in accordance with examples as disclosed herein. In some examples, aspects of the operations of 1630 may be performed by a feedback transmitting component 935 as described with reference to FIG. 9.

Figure 17:
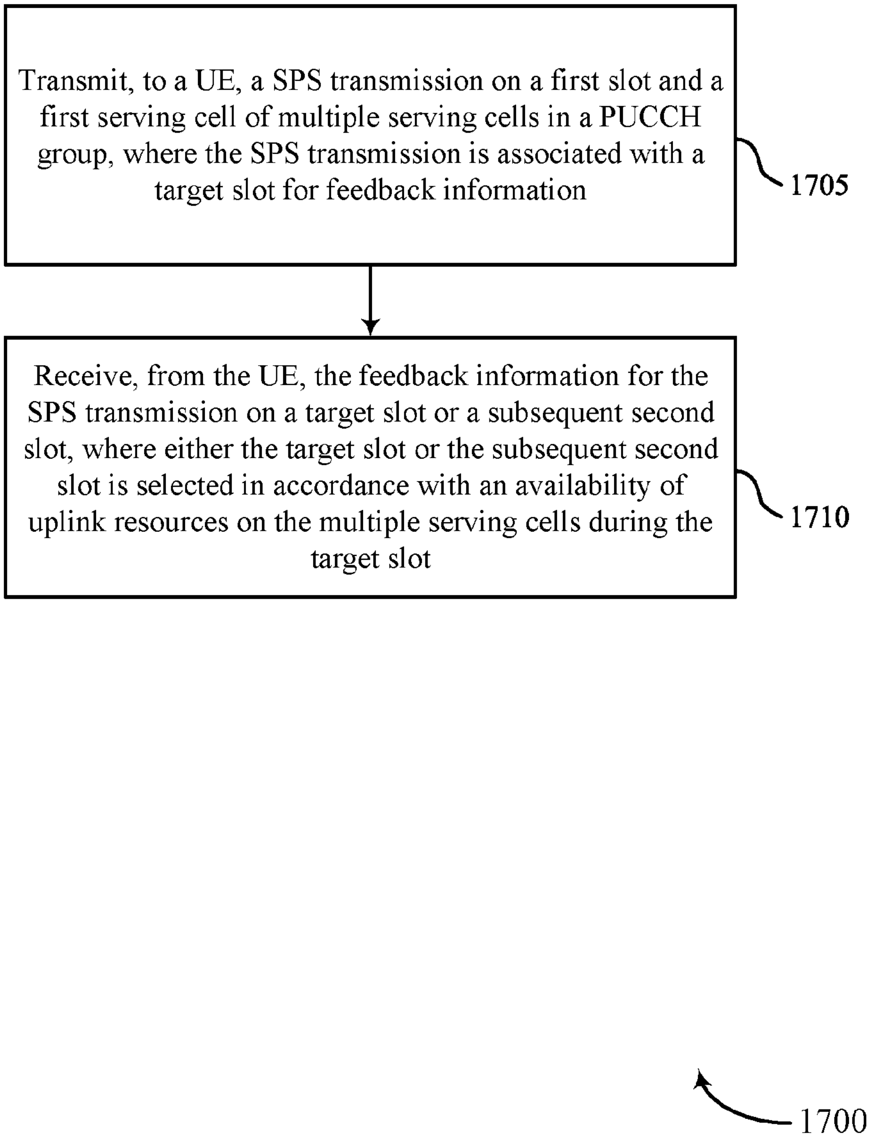

FIG. 17 shows a flowchart illustrating a method 1700 that supports SPS feedback deferral with carrier switching in uplink carrier aggregation in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an SPS transmission on a first slot and a first serving cell of multiple serving cells in a PUCCH group, where the SPS transmission is associated with a target slot for feedback information. The operations of 1705 may be performed in accordance with examples as disclosed herein. In some examples, aspects of the operations of 1705 may be performed by an SPS transmission component 1325 as described with reference to FIG. 13.

At 1710, the method may include receiving, from the UE, the feedback information for the SPS transmission on a target slot or a subsequent second slot, where either the target slot or the subsequent second slot is selected in accordance with an availability of uplink resources on the multiple serving cells during the target slot. The operations of 1710 may be performed in accordance with examples as disclosed herein. In some examples, aspects of the operations of 1710 may be performed by a feedback reception component 1330 as described with reference to FIG. 13.

Figure 18:
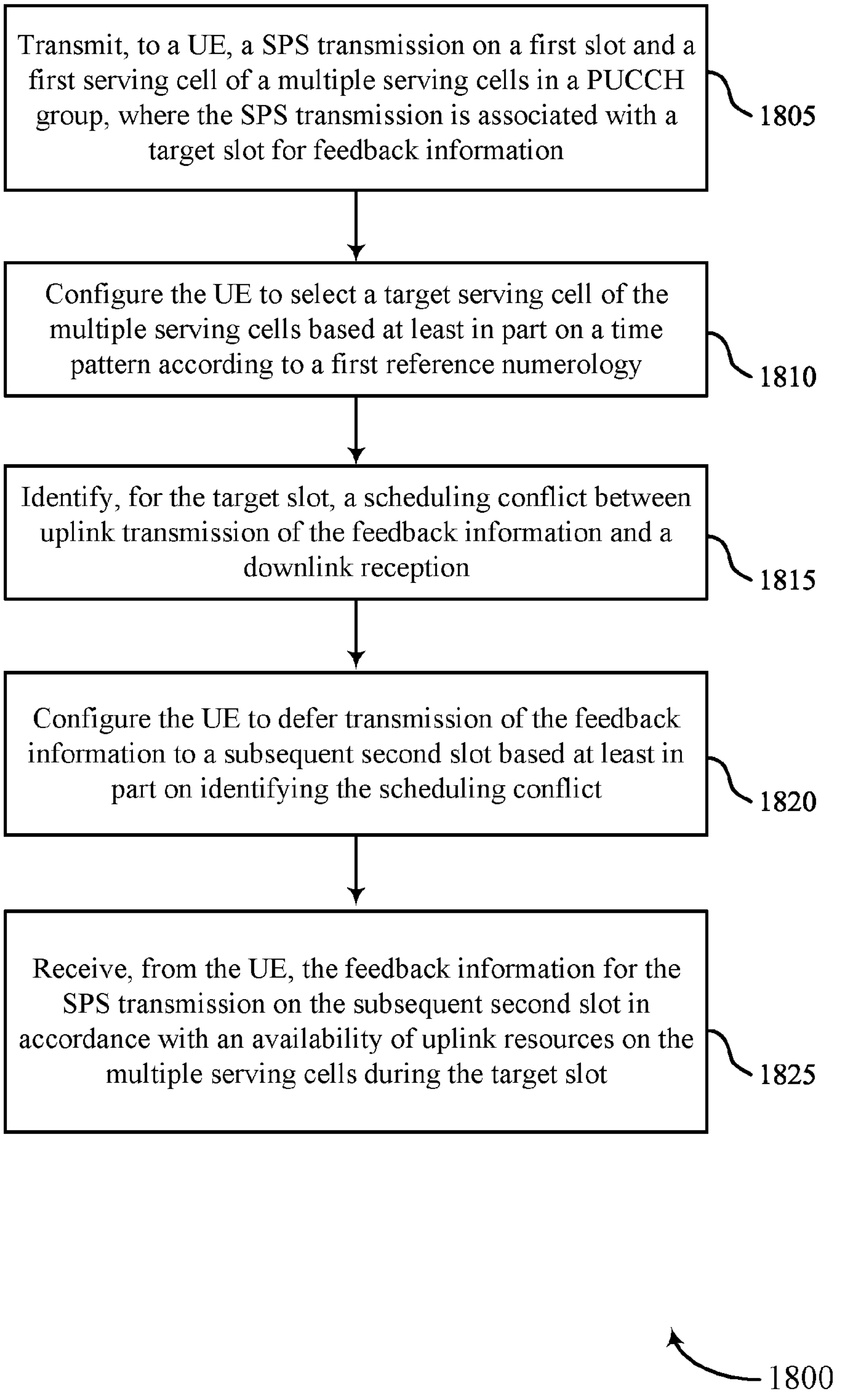

FIG. 18 shows a flowchart illustrating a method 1800 that supports SPS feedback deferral with carrier switching in uplink carrier aggregation in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an SPS transmission on a first slot and a first serving cell of multiple serving cells in a PUCCH group, where the SPS transmission is associated with a target slot for feedback information. The operations of 1805 may be performed in accordance with examples as disclosed herein. In some examples, aspects of the operations of 1805 may be performed by an SPS transmission component 1325 as described with reference to FIG. 13.

At 1810, the method may include configuring the UE to select a target serving cell of the multiple serving cells based on a time pattern according to a first reference numerology. The operations of 1810 may be performed in accordance with examples as disclosed herein. In some examples, aspects of the operations of 1810 may be performed by a cell selection component 1335 as described with reference to FIG. 13.

At 1815, the method may include identifying, for the target slot, a scheduling conflict between uplink transmission of the feedback information and a downlink reception. The operations of 1815 may be performed in accordance with examples as disclosed herein. In some examples, aspects of the operations of 1815 may be performed by a conflict identification component 1340 as described with reference to FIG. 13.

At 1820, the method may include configuring the UE to defer transmission of the feedback information to the subsequent second slot based on identifying the scheduling conflict. The operations of 1820 may be performed in accordance with examples as disclosed herein. In some examples, aspects of the operations of 1820 may be performed by a deferral configuration component 1345 as described with reference to FIG. 13.

At 1825, the method may include receiving, from the UE, the feedback information for the SPS transmission on the subsequent second slot in accordance with an availability of uplink resources on the multiple serving cells during the target slot. The operations of 1825 may be performed in accordance with examples as disclosed herein. In some examples, aspects of the operations of 1825 may be performed by a feedback reception component 1330 as described with reference to FIG. 13.

The following provides an overview of aspects of the present disclosure:

Aspect 1: A method for wireless communication at a UE, comprising: monitoring a first slot for a semi-persistent scheduled transmission on a first serving cell of a plurality of serving cells in a physical uplink control channel group, wherein the semi-persistent scheduled transmission is associated with a target slot for feedback information; selecting between the target slot and a subsequent second slot to transmit the feedback information for the semi-persistent scheduled transmission, wherein the selecting is in accordance with an availability of uplink resources on the plurality of serving cells during the target slot; and transmitting, to a base station, the feedback information for the semi-persistent scheduled transmission on the target slot or the subsequent second slot according to the selection.

Aspect 2: The method of aspect 1, further comprising: selecting a target serving cell of the plurality of serving cells based at least in part on a time pattern according to a first reference numerology, wherein selecting between the target slot and the subsequent second slot to transmit the feedback information for the semi-persistent scheduled transmission is in accordance with the availability of uplink resources on the target serving cell.

Aspect 3: The method of aspect 2, further comprising: identifying, for the target serving cell during the target slot, a scheduling conflict between uplink transmission of the feedback information and a downlink reception; and scanning, according to a predefined ordering, remaining serving cells of the plurality of serving cells for the availability of uplink resources to transmit the feedback information, wherein selecting between the target slot and the subsequent second slot to transmit the feedback information for the semi-persistent scheduled transmission is in accordance with the availability of uplink resources on at least one serving cell of the remaining serving cells during the target slot.

Aspect 4: The method of any of aspects 1 through 3, further comprising: selecting a target serving cell of the plurality of serving cells based at least in part on a time pattern according to a first reference numerology; identifying, for the target slot, a scheduling conflict between uplink transmission of the feedback information and a downlink reception; and deferring transmission of the feedback information to the subsequent second slot based at least in part on identifying the scheduling conflict, wherein selecting the subsequent second slot is in accordance with the availability of uplink resources on the plurality of serving cells.

Aspect 5: The method of aspect 4, further comprising: identifying a maximum deferral value for each serving cell of the plurality of serving cells, wherein deferring transmission of the feedback information is based at least in part on identifying the maximum deferral value.

Aspect 6: The method of any of aspects 4 through 5, further comprising: identifying the target slot based at least in part on a delay parameter according to a second reference numerology, wherein deferring transmission of the feedback information is based at least in part on identifying the target slot.

Aspect 7: The method of aspect 6, wherein the first reference numerology uses the first serving cell as a reference and the second reference numerology uses a second serving cell as a reference.

Aspect 8: The method of aspect 7, wherein the second serving cell comprises at least one of a serving cell with a largest numerology among the plurality of serving cells in the physical uplink control channel group, a serving cell with a smallest numerology among the plurality of serving cells in the physical uplink control channel group, a primary cell of the plurality of serving cells in the physical uplink control channel group, or a combination thereof.

Aspect 9: The method of any of aspects 6 or 8, wherein the first reference numerology and the second reference numerology use a second serving cell as a reference.

Aspect 10: The method of any of aspects 6 through 9, wherein the first reference numerology comprises a numerology of a primary cell of the plurality of serving cells in the physical uplink control channel group, and the second reference numerology comprises a numerology of a serving cell having a largest numerology among the plurality of serving cells in the physical uplink control channel group.

Aspect 11: The method of any of aspects 4 through 10, further comprising: identifying a subset of serving cells of the plurality of serving cells that are configured for deferred transmission on the subsequent second slot; and selecting a second target serving cell of the subset of serving cells for transmission of the feedback information on the subsequent second slot based at least in part on the time pattern.

Aspect 12: The method of aspect 11, further comprising: transmitting, to the base station, the feedback information on the second target serving cell and on the subsequent second slot in accordance with an availability of uplink resources on the second target serving cell during the subsequent second slot.

Aspect 13: The method of any of aspects 11 through 12, further comprising: identifying, for the second target serving cell during the subsequent second slot, a second scheduling conflict between uplink transmission of the feedback information and a downlink reception; scanning, according to a predefined ordering, remaining serving cells of the subset of serving cells based at least in part on identifying the second scheduling conflict; and transmitting the feedback information to the base station on one of the remaining serving cells during the subsequent second slot or deferring transmission of the feedback information to a subsequent third slot in accordance with an availability of uplink resources on the remaining serving cells during the subsequent second slot.

Aspect 14: The method of any of aspects 11 through 13, wherein the subset of serving cells configured for deferred transmission on the subsequent second slot comprises the plurality of serving cells.

Aspect 15: The method of any of aspects 1 through 14, further comprising: generating the feedback information for the semi-persistent scheduled transmission based at least in part on the monitoring, wherein selecting between the target slot and the subsequent second slot is based at least in part on generating the feedback information.

Aspect 16: The method of any of aspects 1 through 15, wherein the first serving cell is a primary cell and remaining serving cells of the plurality of serving cells are secondary cells.

Aspect 17: A method for wireless communication at a base station, comprising: transmitting, to a UE, a semi-persistent scheduled transmission on a first slot and a first serving cell of a plurality of serving cells in a physical uplink control channel group, wherein the semi-persistent scheduled transmission is associated with a target slot for feedback information; and receiving, from the UE, the feedback information for the semi-persistent scheduled transmission on a target slot or a subsequent second slot, wherein either the target slot or the subsequent second slot is selected in accordance with an availability of uplink resources on the plurality of serving cells during the target slot.

Aspect 18: The method of aspect 17, further comprising: configuring the UE to select a target serving cell of the plurality of serving cells based at least in part on a time pattern according to a first reference numerology, wherein the target slot is selected in accordance with the availability of uplink resources on the target serving cell.

Aspect 19: The method of aspect 18, further comprising: identifying, for the target serving cell during the target slot, a scheduling conflict between uplink transmission of the feedback information and a downlink reception; and configuring the UE to scan, according to a predefined ordering, remaining serving cells of the plurality of serving cells for the availability of uplink resources to transmit the feedback information, wherein the target slot is selected in accordance with the availability of uplink resources on at least one serving cell of the remaining serving cells during the target slot.

Aspect 20: The method of any of aspects 17 through 19, further comprising: configuring the UE to select a target serving cell of the plurality of serving cells based at least in part on a time pattern according to a first reference numerology; identifying, for the target slot, a scheduling conflict between uplink transmission of the feedback information and a downlink reception; and configuring the UE to defer transmission of the feedback information to the subsequent second slot based at least in part on identifying the scheduling conflict, wherein the subsequent second slot is selected in accordance with the availability of uplink resources on the plurality of serving cells.

Aspect 21: The method of aspect 20, further comprising: identifying the target slot based at least in part on a delay parameter according to a second reference numerology, wherein the transmission of the feedback information is deferred based at least in part on identifying the target slot.

Aspect 22: The method of aspect 21, wherein the first reference numerology uses the first serving cell as a reference and the second reference numerology uses a second serving cell as a reference.

Aspect 23: The method of aspect 22, wherein the second serving cell comprises at least one of a serving cell with a largest numerology among the plurality of serving cells in the physical uplink control channel group, a serving cell with a smallest numerology among the plurality of serving cells in the physical uplink control channel group, a primary cell of the plurality of serving cells in the physical uplink control channel group, or a combination thereof.

Aspect 24: The method of any of aspects 21 or 23, wherein the first reference numerology and the second reference numerology use a second serving cell as a reference.

Aspect 25: The method of any of aspects 21 through 24, wherein the first reference numerology comprises a numerology of a primary cell of the plurality of serving cells in the physical uplink control channel group, and the second reference numerology comprises a numerology of a serving cell having a largest numerology among the plurality of serving cells in the physical uplink control channel group.

Aspect 26: The method of any of aspects 17 through 25, wherein the first serving cell is a primary cell and remaining serving cells of the plurality of serving cells are secondary cells.

Aspect 27: An apparatus for wireless communication at a UE, comprising a processor; memory coupled with the processor; and instructions stored in the memory and executable by the processor to cause the apparatus to perform a method of any of aspects 1 through 16.

Aspect 28: An apparatus for wireless communication at a UE, comprising at least one means for performing a method of any of aspects 1 through 16.

Aspect 29: A non-transitory computer-readable medium storing code for wireless communication at a UE, the code comprising instructions executable by a processor to perform a method of any of aspects 1 through 16.

Aspect 30: An apparatus for wireless communication at a base station, comprising a processor; memory coupled with the processor; and instructions stored in the memory and executable by the processor to cause the apparatus to perform a method of any of aspects 17 through 26.

Aspect 31: An apparatus for wireless communication at a base station, comprising at least one means for performing a method of any of aspects 17 through 26.

Aspect 32: A non-transitory computer-readable medium storing code for wireless communication at a base station, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by at least one of voltages, currents, electromagnetic waves, magnetic fields or particles, optical fields or particles, or a combination thereof.

The various illustrative blocks and components described in connection with the disclosure herein may be implemented or performed with at least one of a general-purpose processor, a DSP, an ASIC, a CPU, an FPGA or other programmable logic device, discrete gate or transistor logic, discrete hardware components, or a combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in at least one of hardware, software executed by a processor, firmware, or a combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
- monitoring a first slot for a semi-persistent scheduled transmission on a first serving cell of a plurality of serving cells in a physical uplink control channel group, wherein the semi-persistent scheduled transmission is associated with a target slot for feedback information;
- selecting a target serving cell of the plurality of serving cells based at least in part on a time pattern according to a first reference numerology;
- selecting between the target slot and a subsequent second slot to transmit the feedback information for the semi-persistent scheduled transmission, wherein the selecting is in accordance with an availability of uplink resources on the plurality of serving cells during the target slot and in accordance with an availability of uplink resources on the target serving cell; and
- transmitting, to a base station, the feedback information for the semi-persistent scheduled transmission on the target slot or the subsequent second slot according to the selection.

2. The method of claim 1, further comprising:
- identifying, for the target serving cell during the target slot, a scheduling conflict between uplink transmission of the feedback information and a downlink reception; and
- scanning, according to a predefined ordering, remaining serving cells of the plurality of serving cells for the availability of uplink resources to transmit the feedback information, wherein selecting between the target slot and the subsequent second slot to transmit the feedback information for the semi-persistent scheduled transmission is in accordance with the availability of uplink resources on at least one serving cell of the remaining serving cells during the target slot.

3. The method of claim 1, further comprising:
- identifying, for the target slot, a scheduling conflict between uplink transmission of the feedback information and a downlink reception; and
- deferring transmission of the feedback information to the subsequent second slot based at least in part on identifying the scheduling conflict, wherein selecting the subsequent second slot is in accordance with the availability of uplink resources on the plurality of serving cells.

4. The method of claim 3, further comprising:
- identifying a maximum deferral value for each serving cell of the plurality of serving cells, wherein deferring transmission of the feedback information is based at least in part on identifying the maximum deferral value.

5. The method of claim 3, further comprising:
- identifying the target slot based at least in part on a delay parameter according to a second reference numerology, wherein deferring transmission of the feedback information is based at least in part on identifying the target slot.

6. The method of claim 5, wherein the first reference numerology uses the first serving cell as a reference and the second reference numerology uses a second serving cell as a reference.

7. The method of claim 6, wherein the second serving cell comprises at least one of a serving cell with a largest numerology among the plurality of serving cells in the physical uplink control channel group, a serving cell with a smallest numerology among the plurality of serving cells in the physical uplink control channel group, a primary cell of the plurality of serving cells in the physical uplink control channel group, or a combination thereof.

8. The method of claim 5, wherein the first reference numerology and the second reference numerology use a second serving cell as a reference.

9. The method of claim 5, wherein the first reference numerology comprises a numerology of a primary cell of the plurality of serving cells in the physical uplink control channel group, and the second reference numerology comprises a numerology of a serving cell having a largest numerology among the plurality of serving cells in the physical uplink control channel group.

10. The method of claim 3, further comprising:
- identifying a subset of serving cells of the plurality of serving cells that are configured for deferred transmission on the subsequent second slot; and
- selecting a second target serving cell of the subset of serving cells for transmission of the feedback information on the subsequent second slot based at least in part on the time pattern.

11. The method of claim 10, further comprising:
- transmitting, to the base station, the feedback information on the second target serving cell and on the subsequent second slot in accordance with an availability of uplink resources on the second target serving cell during the subsequent second slot.

12. The method of claim 10, further comprising:
- identifying, for the second target serving cell during the subsequent second slot, a second scheduling conflict between uplink transmission of the feedback information and a downlink reception;

scanning, according to a predefined ordering, remaining serving cells of the subset of serving cells based at least in part on identifying the second scheduling conflict; and transmitting the feedback information to the base station on one of the remaining serving cells during the subsequent second slot or deferring transmission of the feedback information to a subsequent third slot in accordance with an availability of uplink resources on the remaining serving cells during the subsequent second slot.

13. The method of claim 10, wherein the subset of serving cells configured for deferred transmission on the subsequent second slot comprises the plurality of serving cells.

14. The method of claim 1, further comprising:

generating the feedback information for the semi-persistent scheduled transmission based at least in part on the monitoring, wherein selecting between the target slot and the subsequent second slot is based at least in part on generating the feedback information.

15. The method of claim 1, wherein the first serving cell is a primary cell and remaining serving cells of the plurality of serving cells are secondary cells.

16. A method for wireless communication at a base station, comprising:

transmitting, to a user equipment (UE), a semi-persistent scheduled transmission on a first slot and a first serving cell of a plurality of serving cells in a physical uplink control channel group, wherein the semi-persistent scheduled transmission is associated with a target slot for feedback information;

configuring the UE to select a target serving cell of the plurality of serving cells based at least in part on a time pattern according to a first reference numerology; and receiving, from the UE, the feedback information for the semi-persistent scheduled transmission on a target slot or a subsequent second slot, wherein either the target slot or the subsequent second slot is selected in accordance with an availability of uplink resources on the plurality of serving cells during the target slot and an availability of uplink resources on the target serving cell during the target slot.

17. The method of claim 16, further comprising:

identifying, for the target serving cell during the target slot, a scheduling conflict between uplink transmission of the feedback information and a downlink reception; and configuring the UE to scan, according to a predefined ordering, remaining serving cells of the plurality of serving cells for the availability of uplink resources to transmit the feedback information, wherein the target slot is selected in accordance with the availability of uplink resources on at least one serving cell of the remaining serving cells during the target slot.

18. The method of claim 16, further comprising:

identifying, for the target slot, a scheduling conflict between uplink transmission of the feedback information and a downlink reception; and configuring the UE to defer transmission of the feedback information to the subsequent second slot based at least in part on identifying the scheduling conflict, wherein the subsequent second slot is selected in accordance with the availability of uplink resources on the plurality of serving cells.

19. The method of claim 18, further comprising:

identifying the target slot based at least in part on a delay parameter according to a second reference numerology, wherein the transmission of the feedback information is deferred based at least in part on identifying the target slot.

20. The method of claim 19, wherein the first reference numerology uses the first serving cell as a reference and the second reference numerology uses a second serving cell as a reference.

21. The method of claim 20, wherein the second serving cell comprises at least one of a serving cell with a largest numerology among the plurality of serving cells in the physical uplink control channel group, a serving cell with a smallest numerology among the plurality of serving cells in the physical uplink control channel group, a primary cell of the plurality of serving cells in the physical uplink control channel group, or a combination thereof.

22. The method of claim 19, wherein the first reference numerology and the second reference numerology use a second serving cell as a reference.

23. The method of claim 19, wherein the first reference numerology comprises a numerology of a primary cell of the plurality of serving cells in the physical uplink control channel group, and the second reference numerology comprises a numerology of a serving cell having a largest numerology among the plurality of serving cells in the physical uplink control channel group.

24. The method of claim 16, wherein the first serving cell is a primary cell and remaining serving cells of the plurality of serving cells are secondary cells.

25. An apparatus for wireless communication at a user equipment (UE), comprising:

one or more processors;

memory coupled with the one or more processors; and instructions stored in the memory and executable by the one or more processors to cause the apparatus to:

monitor a first slot for a semi-persistent scheduled transmission on a first serving cell of a plurality of serving cells in a physical uplink control channel group, wherein the semi-persistent scheduled transmission is associated with a target slot for feedback information;

select a target serving cell of the plurality of serving cells based at least in part on a time pattern according to a first reference numerology;

select between the target slot and a subsequent second slot to transmit the feedback information for the semi-persistent scheduled transmission, wherein the selecting is in accordance with an availability of uplink resources on the plurality of serving cells during the target slot and in accordance with an availability of uplink resources on the target serving cell; and transmit, to a base station, the feedback information for the semi-persistent scheduled transmission on the target slot or the subsequent second slot according to the selection.

26. An apparatus for wireless communication at a base station, comprising:

one or more processors;

memory coupled with the one or more processors; and instructions stored in the memory and executable by the one or more processors to cause the apparatus to:

transmit, to a user equipment (UE), a semi-persistent scheduled transmission on a first slot and a first serving cell of a plurality of serving cells in a physical uplink control channel group, wherein the semi-persistent scheduled transmission is associated with a target slot for feedback information;

configure the UE to select a target serving cell of the plurality of serving cells based at least in part on a time pattern according to a first reference numerology; and receive, from the UE, the feedback information for the semi-persistent scheduled transmission on a target slot or a subsequent second slot, wherein either the target slot or the subsequent second slot is selected in accordance with an availability of uplink resources on the plurality of serving cells during the target slot and an availability of uplink resources on the target serving cell during the target slot.

* * * * *